US006941120B2

(12) United States Patent
Barnett et al.

(10) Patent No.: US 6,941,120 B2
(45) Date of Patent: Sep. 6, 2005

(54) APPARATUS AND METHOD FOR AUTOMATICALLY PROGRAMMING FREQUENCY SCANNING RADIO RECEIVERS

(75) Inventors: Richard E. Barnett, Needham, MA (US); Philip L. Henry, Henderson, NV (US)

(73) Assignee: Gray Electronics, Inc., Henderson, NV (US)

( * ) Notice: Subject to any disclaimer, the term of this patent is extended or adjusted under 35 U.S.C. 154(b) by 824 days.

(21) Appl. No.: 09/784,220

(22) Filed: Feb. 16, 2001

(65) Prior Publication Data

US 2001/0006892 A1 Jul. 5, 2001

Related U.S. Application Data

(63) Continuation-in-part of application No. 09/122,880, filed on Jul. 28, 1998, now Pat. No. 6,192,223.
(60) Provisional application No. 60/054,317, filed on Jul. 29, 1997.

(51) Int. Cl.[7] ................................................ H04B 1/18
(52) U.S. Cl. ............................ 455/164.2; 455/161.1; 455/186.1
(58) Field of Search ..................... 455/150.1, 151.1, 455/154.1, 160.1, 161.1, 161.2, 179.1, 185.1, 186.1, 418, 419, 434, 456.1

(56) References Cited

U.S. PATENT DOCUMENTS

| | | | |
|---|---|---|---|
| 4,888,815 A | * 12/1989 | Ahlemeyer et al. ...... | 455/168.1 |
| 4,969,209 A | * 11/1990 | Schwob ................... | 455/158.4 |
| 5,163,161 A |   11/1992 | Bowles et al. ........... | 455/164.1 |
| 5,355,527 A |   10/1994 | Owaki ...................... | 455/186.2 |
| 5,471,662 A | * 11/1995 | Shiota ...................... | 455/166.1 |
| 5,497,505 A |    3/1996 | Koohgoli et al. .......... | 455/34.1 |
| 5,535,442 A | *  7/1996 | Kishi ....................... | 455/184.1 |
| 5,734,973 A |    3/1998 | Honda ..................... | 455/186.1 |
| 5,768,697 A |    6/1998 | Shirakawa ............... | 455/181.1 |
| 5,898,910 A |    4/1999 | Miyake et al. ........... | 455/186.1 |
| 6,282,412 B1 | * 8/2001 | Lyons ...................... | 455/186.1 |

* cited by examiner

*Primary Examiner*—Quochien B. Vuong
(74) *Attorney, Agent, or Firm*—Leydig, Voit & Mayer, Ltd.

(57) ABSTRACT

A frequency scanning radio receiver scans and receives transmissions on discrete radio frequencies. The frequency scanning radio receiver is programmable to monitor frequencies in a geographical area where the receiver is located. The receiver is coupled to a communication device, located externally or internally of the receiver, for communication with a positioning system, such as the global positioning system, to determine the geographical location of the frequency scanning radio receiver either automatically or in response to a manual request. A data base of frequency allocation data, either internal to the radio or in a remotely located host system, provides frequency data to a memory in the frequency scanning radio receiver based on geographical location of the receiver determined through the communication device to program the receiver to monitor local radio frequency transmissions.

32 Claims, 13 Drawing Sheets

ID
APPARATUS AND METHOD FOR AUTOMATICALLY PROGRAMMING FREQUENCY SCANNING RADIO RECEIVERS

This disclosure is a continuation-in-part of U.S. patent application Ser. No. 09/122,880, filed Jul. 28, 1998, now U.S. Pat. No. 6,192,223, the disclosure of which is incorporated by reference, and which claims the priority of U.S. Patent Application 60/054,317, filed Jul. 29, 1997.

BACKGROUND OF THE INVENTION

The present invention relates to frequency scanning radio receivers. More particularly, the present invention relates to automatically programming the receiving frequencies of a frequency scanning radio receiver to frequencies on which signals are broadcast in the geographical location of the receiver, even if the receiver is continually moved to different locations.

Conventional frequency scanning radio receivers monitor radio transmissions by continually tuning the receiver, i.e., scanning, a group of discrete frequencies. When a transmission is detected on a frequency to which the receiver tunes, and the transmission signal level exceeds a threshold, tuning stops and the transmission is monitored. All radio receivers can only receive transmissions within a limited geographic area. The transmissions of usual interest to listeners using frequency scanning receivers are, for example, police, emergency medical services, fire, and public service agencies, assigned to discrete frequencies. Other local transmissions, for example, transmissions from local businesses, may not be of interest to these listeners. Therefore, a listener must determine the frequencies of interest that are to be monitored and tune or program the frequency scanning receiver so that only those frequencies are monitored.

Historically, scanning radio receivers have been manually programmable, i.e., a listener manually inputs to a memory in the receiver the frequencies to be monitored. The frequencies of interest are established by experience, from Federal Communications Commission (FCC) license records, by purchase of channel listings from a private source, or otherwise. Privately published frequency allocations are frequently out-of-date.

Manually programming a radio receiver to monitor selected channels is an onerous and time consuming task that is subject to data entry errors. Programming a radio receiver involves consulting an owner's manual, and manually entering programming data and each frequency to be monitored using an input device, such as a keypad.

A frequency scanning radio receiver requires reprogramming whenever the listener changes geographic areas. The difficulty and time required to program and reprogram a conventional scanning radio receiver has led to listener frustration and is a major cause of return of frequency scanning radio receivers to retailers and manufacturers for refunds. Accordingly, there exists a need for a frequency scanning radio receiver that overcomes the problems of manual programming of frequencies of interest.

SUMMARY OF THE INVENTION

An object of the present invention is to provide a frequency scanning radio receiver in which the receiving frequencies of interest are automatically programmed into the receiver.

Another object of the invention is to provide a frequency scanning receiver with an internal circuit for determining the geographical location of the receiver to determine whether the programmed receiving frequencies need to be updated because of a change in location of the receiver.

Another object of the present invention is to provide a frequency scanning radio receiver in which the receiving frequencies of interest in a local area specified by the listener are automatically programmed into the receiver from a data base at a remote location or from a data base within the receiver.

A further object of the present invention is to provide a host system that stores frequency allocation information for geographic locations and for assembling and transmitting frequency allocation information for any location, upon request, for programming receiving frequencies into a frequency scanning radio receiver.

According to a first aspect of the invention, a programmable frequency scanning radio receiver comprises a receiver for receiving radio frequency transmissions at each of a plurality of discrete frequencies; a communication device coupled to the frequency scanning radio receiver for determining the geographical location of the frequency scanning radio receiver by communication with a geographical positioning system; a memory for storing frequency data, the frequency data including a plurality of frequencies corresponding to respective transmitting parties of interest located within a reception range of the geographical location of the frequency scanning radio receiver; and a processing circuit coupled to the memory, the receiver, and the communication device, accessing the memory, controlling the receiver to monitor transmissions only at the frequencies of the frequency data in the memory, and controlling and receiving determination of the geographical location and supplying the geographical location of the frequency scanning radio receiver by the communication device for updating the frequency data.

According to a second aspect of the invention, a programmable frequency scanning radio receiver comprises a receiver for receiving radio frequency transmissions at each of a plurality of discrete frequencies; a memory for storing frequency data, the frequency data including a plurality of frequencies corresponding to respective transmitting parties of interest located within a reception range of the geographical location of the frequency scanning radio receiver; a data base of frequency allocations and geographical location information corresponding to the frequency allocations, internal to the frequency scanning radio receiver, for programming the frequency scanning radio receiver; and a processing circuit coupled to the memory, the receiver, and the data base, assembling frequency data from the data base, based on the geographical location of the frequency scanning radio receiver, storing in the memory the frequency data assembled from the data base, and controlling the receiver to monitor transmissions only at the frequencies of the frequency data in the memory.

According to yet another aspect of the present invention, a method of automatically programming a frequency scanning radio receiver to monitor transmissions only on programmed discrete frequencies comprises determining the geographical location of the frequency scanning radio receiver through a communication device coupled to the frequency scanning radio receiver by communication with a geographical positioning system; in response to the geographical location determination, assembling frequency data from a data base including frequency allocations and geographical location information corresponding to the frequency allocations for locations proximate the geographical location of the frequency scanning radio receiver determined through the communication device; supplying the frequency data from the data base to a memory in the frequency scanning radio receiver; and, in response to the frequency data received from the data base, programming the frequency scanning radio receiver to monitor transmissions only on operating frequencies of the frequency data.

According to a fourth aspect of the invention, a programmable transceiver includes a receiver for receiving radio frequency transmissions at each of a plurality of discrete frequencies; a transmitter for transmitting radio frequency transmissions at each of a plurality of discrete frequencies; a communication device coupled to the transceiver for determining the geographical location of the transceiver by communication with a geographical positioning system; a memory for storing frequency data, the frequency data including a plurality of frequencies corresponding to respective transmitting and receiving parties of interest located within a reception and transmission range of the geographical location of the transceiver; and a processing circuit coupled to the memory, the receiver, the transmitter, and the communication device, accessing the memory, controlling the receiver and the transmitter to operate only at the frequencies of the frequency data in the memory, and controlling and receiving a determination of the geographical location of the transceiver by the communication device for updating the frequency data.

According to a fifth aspect of the invention, a programmable transceiver includes a receiver for receiving radio frequency transmissions at each of a plurality of discrete frequencies; a transmitter for transmitting radio frequency transmission at each of a plurality of discrete frequencies; a memory for storing frequency data, the frequency data including a plurality of frequencies corresponding to respective transmitting and receiving parties of interest located within a reception and transmission range of the geographical location of the transceiver; a data base of frequency allocations and geographical location information corresponding to the frequency allocations, internal to the transceiver, for programming the transceiver; and a processing circuit coupled to the memory, the receiver, the transmitter, and the data base, assembling the frequency data from the data base, based on the geographical location of the transceiver, storing in the memory the frequency data assembled from the data base, and controlling the receiver and the transmitter to operate only at the frequencies of the frequency data in the memory.

According to a sixth aspect of the invention, a method of automatically programming a transceiver includes determining the geographical location of the transceiver through a communication device coupled to the transceiver by communicating with a geographical positioning system; in response to the geographical location determination, assembling frequency data from a data base including frequency allocations and geographical location information corresponding to the frequency allocations for locations proximate the geographical location of the transceiver determined through the communication device; supplying the frequency data from the data base to a memory in the transceiver; and in response to the frequency data received from the data base, programming the transceiver to operate only on operating frequencies of the frequency data.

BRIEF DESCRIPTION OF THE DRAWINGS

In all figures, like elements are given the same reference numbers.

DETAILED DESCRIPTION OF THE INVENTION

Figure 1:
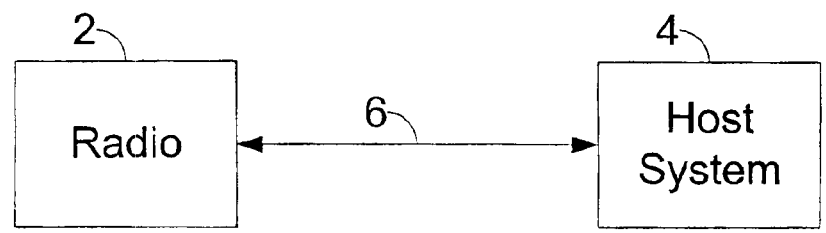
FIG. 1 is a block diagram of a frequency scanning radio receiver programming apparatus.

An embodiment of a frequency scanning radio receiver programming apparatus is illustrated in FIG. 1. The frequency scanning radio receiver programming apparatus comprises a frequency scanning radio receiver 2, a host system 4, and a communication medium 6. The frequency scanning radio receiver 2 includes a tuner that sequentially scans radio frequencies that are selected or specified by a listener and stored in the receiver. The frequency scanning radio receiver 2 includes a memory and a processing circuit for controlling operation and programming the receiver. The processing circuit controls the receiver according to a control program stored in the memory.

The frequencies to be monitored by the frequency scanning radio receiver 2 are automatically programmable from outside the receiver and may be changed at will. More particularly, the frequency scanning radio receiver 2 receives frequency data from the host system 4 through the communication medium 6, in response to a request, and programs the receiver frequencies using that frequency data. The radio receiver 2 includes a communication device, such as a modem, electronic or acoustical, or a specialized receiver section, to receive the frequency data from the host system 4. In some embodiments, the communication device sends a programming request from the frequency scanning radio receiver 2 to the host system 4 and receives the frequency data from the host system 4. In other embodiments, the listener sends a programming request through one communication medium, and the communication device receives the frequency data through another communication medium. In still other embodiments, the radio receiver 2 may utilize the same receiver to monitor radio frequency transmissions and to receive the frequency data. The scanning radio receiver 2 may also be manually programmable through a user interface, such as a keypad.

The host system 4 embodying the present invention comprises a processing circuit for processing programming requests from the frequency scanning radio receiver 2. The host system assembles frequency data to be sent to the frequency scanning radio receiver 2 in response to a programming request. The host system 4 includes a memory device that stores a control program for the processing circuit, frequency allocation information, such as licensee, location, frequency, usage type, and associated geographic information. The host system uses the geographic information in responding to a programming request and assembling frequency data for a specific geographical area to be sent to a frequency scanning radio receiver. However, the present invention is not limited to using geographic information to assemble frequency data. Any information that enables the host system to assemble operating frequencies of interest for a listener may be used. The host system 4 also includes a communication device, such as a modem, for communicating with the frequency scanning radio receiver 2.

The communication medium 6 comprises any medium suitable for transferring data between the host system 4 and the frequency scanning radio receiver 2. For example, if the host system 4 and a frequency scanning radio receiver 2 each include a modem, the communication medium may comprise a telephone network. In an alternative embodiment, the host system 4 and the frequency scanning radio receiver 2 may communicate using a wireless medium, such as a mobile telephone, pager network, and/or satellite network. In another alternative, the host system 4 and the frequency scanning radio receiver 2 may communicate using a combination of different media. For example, a programming information request may be sent by a telephone network and the frequency data may be received by the same receiver or part of the same receiver that is used to monitor radio frequency transmissions, i.e., the frequency scanning receiver.

Although the illustrated embodiment depicts a single host system 4 and a single scanning radio receiver 2, generally, a single host system creates and electronically transmits frequency data to a multitude of frequency scanning radio receivers.

Further, the programming system may include more than one host system for creating and electronically transmitting frequency data to frequency scanning radio receivers. A plurality of host systems, at a single location or multiple locations, enables the programming system to receive and process programming requests from a plurality of radios efficiently, even when multiple programming requests are received simultaneously.

Figure 2:
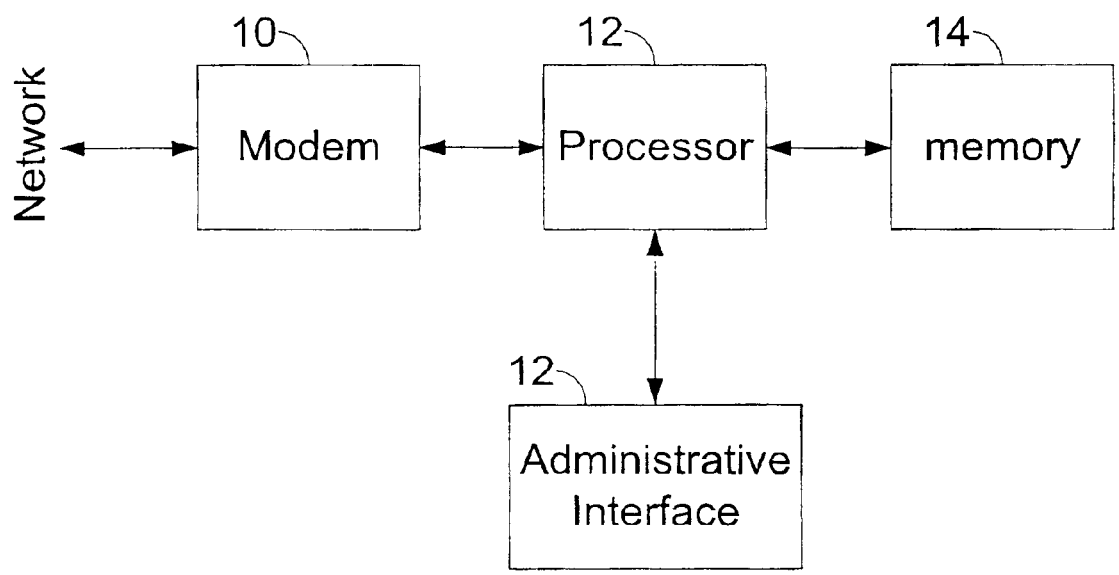
FIG. 2 is a block diagram of a host system usable with embodiments of the present invention.

FIG. 2 is a block diagram of a host system embodying the present invention. In the illustrated embodiment, the host system communicates with the frequency scanning radio receiver through a telephone network using a modem 10. The modem 10 sends frequency data to the frequency scanning radio receiver. In a preferred embodiment, the modem 10 also receives programming requests from the frequency scanning radio receiver including a modem. The modem 10 may comprise an analog modem or a digital modem, for example, an ISDN modem.

The host system includes a memory 14 and a processing circuit 12 for controlling the host system. Exemplary host system operations include receiving programming requests from a frequency scanning radio receiver, storing frequency allocation information, creating customized frequency data for a frequency scanning radio receiver in response to a programming request, and delivering the customized frequency data to the requesting frequency scanning radio receiver. In a preferred embodiment, the processing circuit 12 comprises a microprocessor that executes programs stored in the memory 14. An administrative interface 16 comprises an input device, such as a keyboard, a display device, such as a video display, and a software interface for modifying operation of the host system. In a preferred embodiment, the host system including the administrative interface comprises a personal computer.

The memory 14 of the host system stores geographic information and the frequency allocation information. In a preferred embodiment, the memory 14 includes a geographic information data base comprising the geographical information and a frequency allocation data base storing the frequency allocation information, preferably taken from continually updated FCC records. The geographic information data base comprises geographical information used to convert a programming request from a frequency scanning radio receiver into a format suitable for searching the frequency allocation data base for frequency allocation information corresponding to the listener's geographical area. The information in the data bases is used to assemble frequency data in response to a programming request.

In automatic programming, the processing circuit 12 uses a code, such as a postal code, for example, a zip code, indicating the location of the frequency scanning radio receiver and supplied in a programming request to extract geographic information from the geographic information data base. The information extracted from the geographic information data base is used to search the frequency allocation data base for frequency information. These two data bases may be merged into a single data base or divided into a larger number of data bases.

In one embodiment, the geographic information data base comprises postal codes, and a city or town, a county, a state, and a region corresponding to each of the postal codes. The host system uses the postal code in a programming request to identify the geographical location of a frequency scanning radio receiver and to extract frequency and licensee, i.e., user, information from the frequency allocation data base. As an alternative to using a postal code to identify the geographical location of a scanning radio receiver, the host system may identify the geographical location of a scanning radio receiver using a telephone number from which the scanning radio receiver or listener contacts the host system. In that case, the geographic data includes information converting telephone number information to location information, such as postal codes or longitude and latitude. The postal codes may also be correlated with longitude and latitude locations. Alternatively, the scanning receiver location may be specified by longitude and latitude, although that data may not be available to a listener. Longitude and latitude data is useful since FCC records usually specify transmitter location using that location data.

In a preferred embodiment, the geographic information data base includes cross references for parent communities when a postal code specifies a sub-community. For example, a postal code may specify a sub-community as a town or city. However, records in the frequency allocation data base derived from FCC licenses may not contain the name of the sub-community. Accordingly, the host system uses the geographic information data base to translate the sub-community corresponding to a postal code into a parent community. For example, if a listener enters zip code "02147", "Brookline Village," which is a sub-community of the city of Brookline, Mass. is specified. Records derived from FCC licenses for the city of Brookline may not be extracted from the second data base using "Brookline Village" as a search key. Accordingly, the host system preferably converts "Brookline Village" into "Brookline" and uses "Brookline" to search the frequency allocation data base.

The frequency allocation data base includes a plurality of records. Each record preferably includes a FREQUENCY field, a USER field, and a SERVICE CODE field. An example of a frequency allocation data base record is:

| FREQUENCY | USER | SERVICE CODE |
| --- | --- | --- |
| 150.995 | Dunstable, town of | PL |

The FREQUENCY field specifies the frequency in MHz allocated to the user. The USER field indicates the user as listed in an FCC license. The SERVICE CODE field indicates the nature of the use, for example, police, fire, highway service, etc. For example, the sample entry indicates that the local police in the town of Dunstable have been allocated an operating frequency of 150.995 MHz. Additional fields other than those shown in the example may be included in a frequency allocation data base record.

Figure 3:
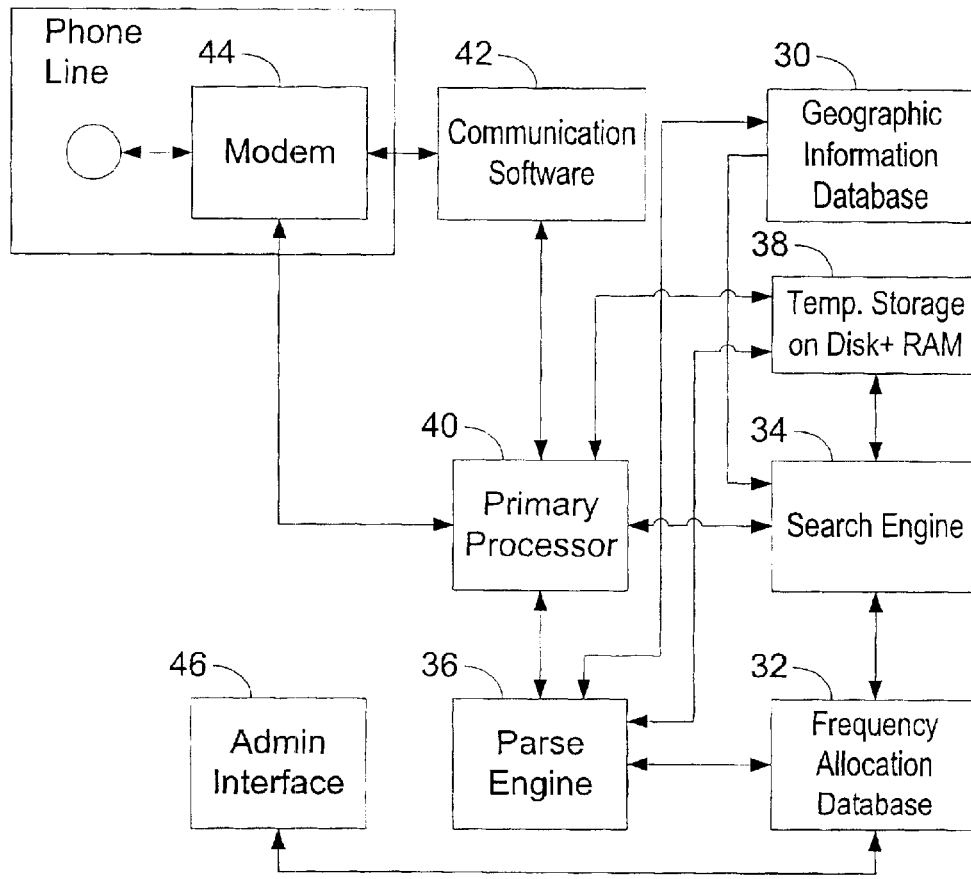
FIG. 3 is a block diagram of a host system usable with embodiments of the present invention.

Referring to FIG. 3, in order to locate data in the data bases 30 and 32, the host system includes a search engine 34 for searching the data bases. The search engine 34 may be stored in the memory 14 and directs the processing circuit 12 to extract information from the data bases. When the geographic information data base 30 comprises a plurality of postal codes and a frequency scanning radio listener sends the postal code to the host system, the search engine 34 searches the geographic information data base 30 for a postal code. The search engine 34 preferably extracts a city, county, state, and region corresponding to the postal code. The search engine 34 uses these identifiers to extract data sets from the frequency allocation data base 32. The data sets correspond to frequency allocations for city, county, state, and regional agencies.

The records extracted by the search engine 34 are preferably limited to service codes PL, PH, PS, PP, GP, GF, YP, and YF. These service codes correspond to records for government, highway, police, and fire. The present invention is not limited to extracting records having these specific service codes but these codes correspond to the transmitting parties of interest to a majority of frequency scanning radio receiver listeners. The search engine 34 may be configured to extract records having any service code of interest to a listener.

For the first data set, the search engine 34 searches the frequency allocation data base 32 and extracts the records having a USER field including the city extracted from the geographic information data base 30. For the second data set, the search engine 34 extracts records for the county in which the city is located. For the third data set, the search engine 34 extracts records that contain the state in which the city is located. For the fourth data set, the search engine 34 extracts records for cities and towns within a predetermined radius of a longitude and latitude of the city extracted from the postal code data base. The search engine 34 stores these four data sets in a temporary storage location 60.

According to another important feature, a scanning radio receiver displays the identity of a transmitting party, not merely the transmitting frequency, to a radio listener. Accordingly, the host system includes a parse engine 36 for transforming the data sets extracted from the frequency allocation data base 32 into a form for displaying the identity of a transmitting party. The parse engine 36 also transforms data from the data bases into a format usable for controlling a frequency scanning radio.

In order to transform the data sets into a format for displaying the identity of a transmitting party, the parse engine 36 first removes duplicate records from the data sets. Removing duplicates includes searching through each of the four data sets, comparing the records, and deleting duplicates. The parse engine 36 next removes unnecessary fields from the data sets. In a preferred embodiment, the fields that remain in the data sets are FREQUENCY, USER, SERVICE CODE, and TX TYPE. Additional fields are preferably deleted to reduce the volume of programming information to be transmitted to a frequency scanning radio receiver.

Once the additional fields are deleted, the parse engine 36 preferably removes records for repeater channels, i.e., channels that are not the source of a transmission but merely relay, on a different frequency, a signal to increase broadcasting range. More particularly, the parse engine 36 uses the TX TYPE field to delete records that are not base channels in repeater systems. The TX TYPE field is used to distinguish repeater channel records from base channel records. For example, records not containing FB2, FB4, or FB* in the TX TYPE field are repeater channel records. Alternatively, the repeater channel records may be omitted from the frequency allocation data base 32 from which the data sets are created.

The parse engine 36 next converts the data sets into a format for grouping according to user type. The host system uses the groupings to create transmitting party identification data that is eventually displayed to a listener. The frequency scanning radio receiver may use the groupings to arrange the records into banks and sub-banks in memory. In order to convert the data sets, the parse engine 36 reduces all of the records in the four data sets to three fields: FREQUENCY, USER, and SERVICE CODE. For example, a reduced record may comprise:

150.995 Dunstable, town of PH.

Figure 4:
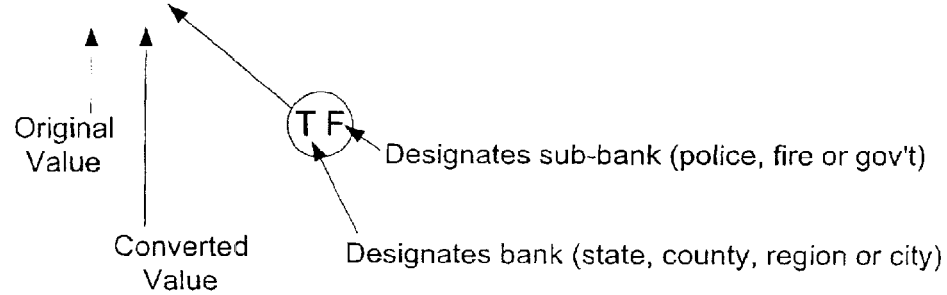
FIG. 4 is a service code conversion table usable with embodiments of the present invention.

Next, the parse engine 36 converts the service codes into a uniform format, e.g., as shown in FIG. 4, to enable a frequency scanning radio receiver to store the entries in banks and sub-banks. For example, for all records in the first data set, corresponding to the listener's town or city, parse engine 36 changes the first character of the service code to "T". For all records in the second data set, corresponding to the listener's county, parse engine 36 changes the first character of the service code to "C". For all records of the third data set, corresponding to the listener's state, the parse engine changes the first character of the service code to "S".

Finally, for all entries of the fourth data set, corresponding to the listener's region, the parse engine changes the first character of the service code to "R". Thus, a preferred embodiment uses the characters T, C, S, and R in the converted service codes to distinguish the records according to town or city, county, state, and region, respectively. However, any characters may be used to distinguish the records.

The parse engine 36 converts the USER fields in the data sets into a format that readily identifies a transmitting party to a listener. For the city and regional data sets, the parse engine 36 may remove the comma and all characters to the right of the comma in the USER field, leaving the city or town name in the USER field. Thus, the USER field "Dunstable, town of" becomes "Dunstable". The parse engine 36 then appends a description of the transmitting party to the USER field of each record, according to the last character of the SERVICE CODE field of each record. For example, if the last character of the service code is "F", the parse engine 36 appends the word "Fire" to the USER field. If the last character of the service code is "P", the parse engine 36 appends the word "Police". If the last character is "L", the parse engine 36 appends nothing. The scanning radio receiver that receives the frequency data displays the transformed USER fields to the listener, identifying a transmitting party. For example, if the Dunstable town fire department is transmitting, the radio receiver displays "Dunstable Fire".

For the county data set, the parse engine 36 removes the comma and the characters to the right of the comma in the USER field in each of the records, leaving the county name. The parse engine 36 then appends a description of the transmitting party, according to the last character of the service code of each record. If the last character of the service code is "P", the parse engine 36 appends the words "County Sheriff". If the last letter of the service code is "F", the parse engine 36 appends the words "County Fire". If the last character of the service code is "H", the parse engine appends the words "County Highway". If the last character is "L", only the word "County" is appended. Thus, an example of identification data displayed to a listener is "Orange County Sheriff".

For the state data set, the parse engine 36 removes the comma and the characters to the right of the comma in the USER field of each of the records, leaving the state name. The parse engine 36 then appends a description of the transmitting party, according to the last character of the service code of each record. If the last character of the service code is "P", the parse engine appends the words "State Police". In a preferred embodiment, the parse engine 36 deletes records that do not include the character "P" in the service code, because the only state agency of interest to a majority of listeners is the state police. However, monitoring of other transmissions by other state agencies is within the scope of the invention. An example of data that a frequency scanning radio receiver may display when receiving a transmission from the state police is "Mass State Police".

Although the parse engine 36 prepares the data sets for displaying transmitting party identification information as described, the present invention is not intended to be limited to these examples. Any user information that identifies a transmitting party is within the scope of the invention. For example, when a transmitting party is a business or an individual, the scanning radio may display the name of the business or the individual to the listener.

After preparing the data sets, the parse engine 36 merges the data sets and stores them in the temporary storage location 38. A primary processor 40 then sends a message to the radio receiver indicating that the programming data set is ready for transmission. Once the frequency scanning radio receiver indicates that it is ready to receive the transmission, communication software 42 sends the frequency data, i.e., the information described, not merely frequencies, to the radio through a modem 44 and the telephone network 46.

In order to transmit the frequency data, the communications software 42 may include a derivative of the standard upload/download protocol, such as zmodem. The present invention is not limited to an upload/download protocol derived from zmodem. For example, the upload/download protocol may be derived from xmodem, kermit, or any other protocol suitable for data transfer.

An exemplary programming data set created by the host system for a postal code provided to the host system is as follows:

<BOD>418.5125;Westford Police;TP#033.6000;Westford Fire;TF#155.9250;Westford Highway;TL#154.8510;Acton Police;RP#045.5000;Acton Fire;RF#153.9950;Acton Highway;RL#;408.0875;Bellerica Police;RP#154.9950;Billerica Fire;RF#042.3400;MA State Police;SP#866.5125;MA State Police;SP#045.9400;Middlesex Sheriff;CP#046.0200;Middlesex Sheriff;CP#033.6600;Middlesex Fire;CF#<EOD>.

In the exemplary data set, <BOD> indicates a beginning of data set character, which informs the scanning radio receiver CPU to process data until an end of data set character <EOD> is received. 482.5125 is the frequency of the first record. The radio receiver reads each field until a field separator is received. ";" is used as a field separator in this example. "Westford Police" is a user description to be displayed to a listener. "TP" is the modified service code. "#" is a record separator used to separate records in the data set.

The programming data set example illustrated above includes operating frequencies usable by a scanning radio receiver for tuning to monitor a set of operating frequencies of interest to a listener. The data set also includes user identification information identifying the transmitting party to the radio operator. The format illustrated above is preferred. However, the present invention is not limited to any particular programming data set format.

Although the described host system includes two data bases, a parse engine, and a search engine that create the frequency data, this description is not so limited. For example, all of the frequency information could be arranged in advance and stored in memory with the corresponding postal code. When a listener transmits a postal code to the host system, the host system may simply look up the postal code and transmit the prepared frequency information to the receiver. Such a system complicates incorporation of frequency allocation changes. In the described embodiment, license changes only require modification of the affected record and are automatically included in the frequency data sent to a scanning radio.

Once the host system sends the frequency data to a frequency scanning radio receiver, the host system waits for a signal from the scanning radio that indicates that the frequency data was received successfully. If the frequency data was received successfully, the communications software 42 resets the host modem 52. The host system is then ready to receive a programming request from another frequency scanning radio receiver. If the host system does not receive a signal indicating successful transmission, the host sends a reset signal and resends the frequency data. The process is preferably repeated until the radio receiver indicates that the frequency data has been received successfully. Alternatively, the host system may try to send the frequency data a predetermined number of times before the host system resets to receive another programming request.

Figure 5:
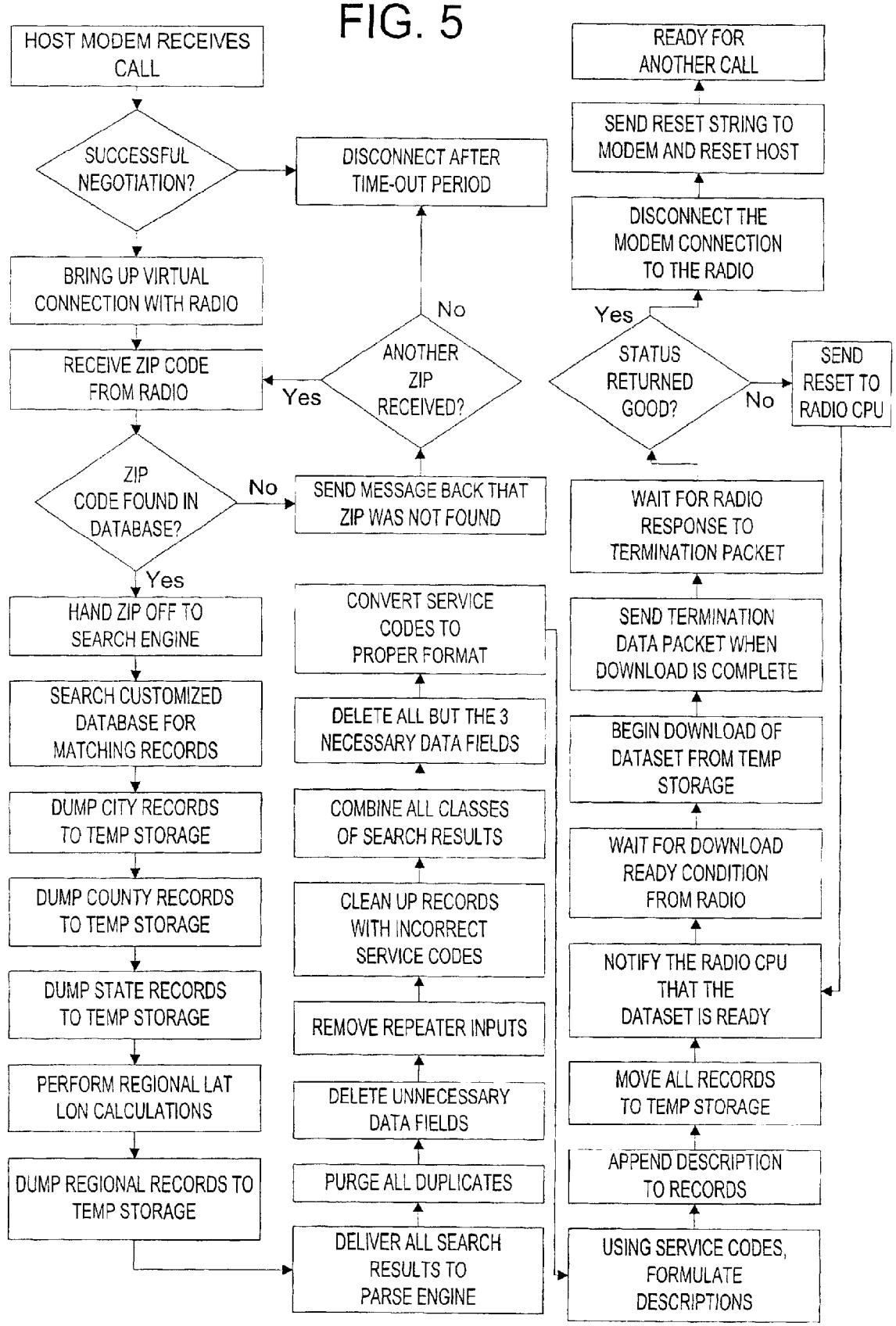
FIG. 5 is a flow chart illustrating an example of the operation of a host system.

FIG. 5 is a flow chart illustrating an example of the operation of the host system according to the foregoing description.

Figure 6:
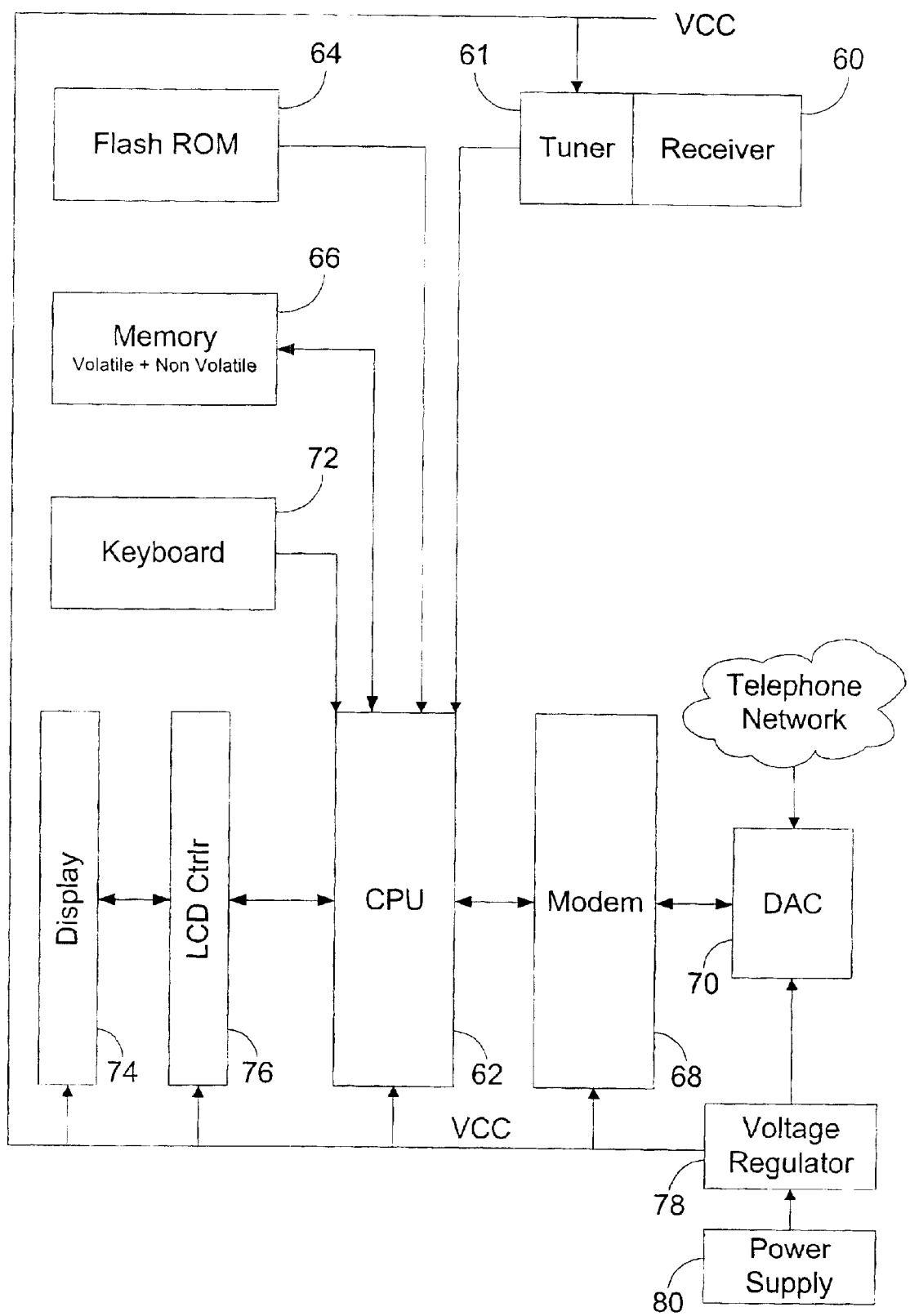
FIG. 6 is a block diagram of a frequency scanning radio receiver.

FIG. 6 is a block diagram of a frequency scanning radio receiver. The radio receiver 60 includes a tuner 61 for frequency scanning and receiving radio frequency transmissions. The tuner 61 is preferably capable of scanning a continuous range of radio frequencies. The tuner 61 may monitor a transmission at any frequency in the range when the transmission signal strength exceeds a sensitivity threshold. In a preferred embodiment, the tuner 61 is automatically programmable to scan a subset of frequencies in the range of frequencies and to exclude transmissions occurring at frequencies not in the subset.

In order to control which frequencies the receiver 60 monitors, a central processing unit (CPU) 62 is coupled to the receiver 60. For example, the CPU 62 may execute a program stored in a memory 64 that reads a table of frequencies stored in another memory 66. When a transmission is detected by the receiver 60, the CPU 62 searches the memory 66 for the transmission frequency. If the CPU 62 finds the frequency, the CPU 62 controls the receiver 60 so that the tuner 61 stops frequency scanning and receives the transmission. If the CPU 62 does not find the frequency, the CPU 62 directs the tuner 61 to continue scanning frequencies. In a preferred embodiment, the CPU 62 comprises a microprocessor.

In order to receive frequency data from the host system, the radio receiver preferably includes a communication device such as a modem 68. The modem 68 may be analog or digital. The modem 68 may be internal or external. In a preferred embodiment, the modem 68 comprises an internal analog modem. The modem 68 includes a digital-to-analog converter (DAC) 70 to convert digital signals from the radio receiver into analog signals suitable for transmission through a telephone network. In embodiments where the modem 68 comprises a digital modem, the DAC 70 may be omitted. In embodiments in which frequency data is received through the receiver 60, the modem 68 may be omitted.

The frequency scanning radio receiver includes one or more memories for storing frequency data sent from the host system and operating programs for controlling receiver functions. The memory 64 according to the illustrated embodiment comprises a flash ROM storing a program for controlling the operation of the frequency scanning radio receiver, such as frequency scanning, receiving frequency data from the host system, and transmitting data to the host system. The memory 66 comprises a volatile portion and a non-volatile portion. The non-volatile portion stores a telephone number for the host system in embodiments where the radio is programmed through a telephone network. The non-volatile portion also stores frequency data received from the host system. The volatile portion stores data entered by the listener. For example, the volatile portion may store geographic information entered by the listener before the information is transmitted to the host system through the modem 68. The frequency scanning radio receiver does not require and is not limited to two memories 64 and 66 or to any particular type of memory.

For controlling the operation of the radio receiver and communicating with the host system, the frequency scanning radio receiver includes an input device, such as keyboard 72. The keyboard 72 may include one or more alphanumeric keys for manually programming the radio receiver. The keyboard 72 preferably also includes a "program" key that initiates a program stored in memory to connect the radio receiver to the host system via the modem 68 for receiving frequency data. The listener may also use the keyboard to alter the frequency data received from the host system. For example, the listener may desire to program the frequency scanning radio receiver manually to monitor a frequency in addition to the frequencies included in the frequency data prepared by the host system. Accordingly, the keyboard 72 allows the operator to access a programming data set stored in the memory 66 to make additions and/or deletions to the frequency data.

The radio receiver includes a display 74 for displaying user identification information to a listener. Displaying the identification of a transmitting party enables the listener to identify the source of a transmission quickly and accurately. In order to display user identification data, the CPU 62 reads the frequency data in the memory 66 and transmits the identification data to the display 74. The display 74 may be any type of display suitable for displaying information to a listener, such as a liquid crystal display, a light emitting diode display, or a graphics display, such as an SVGA display. In the illustrated embodiment, the display 74 comprises an LCD display with an LCD controller 76. The display 74 also displays programming status information to the listener. For example, when the radio receiver is receiving frequency data from the host system, the display 74 may display "Programming in Progress".

Figure 7:
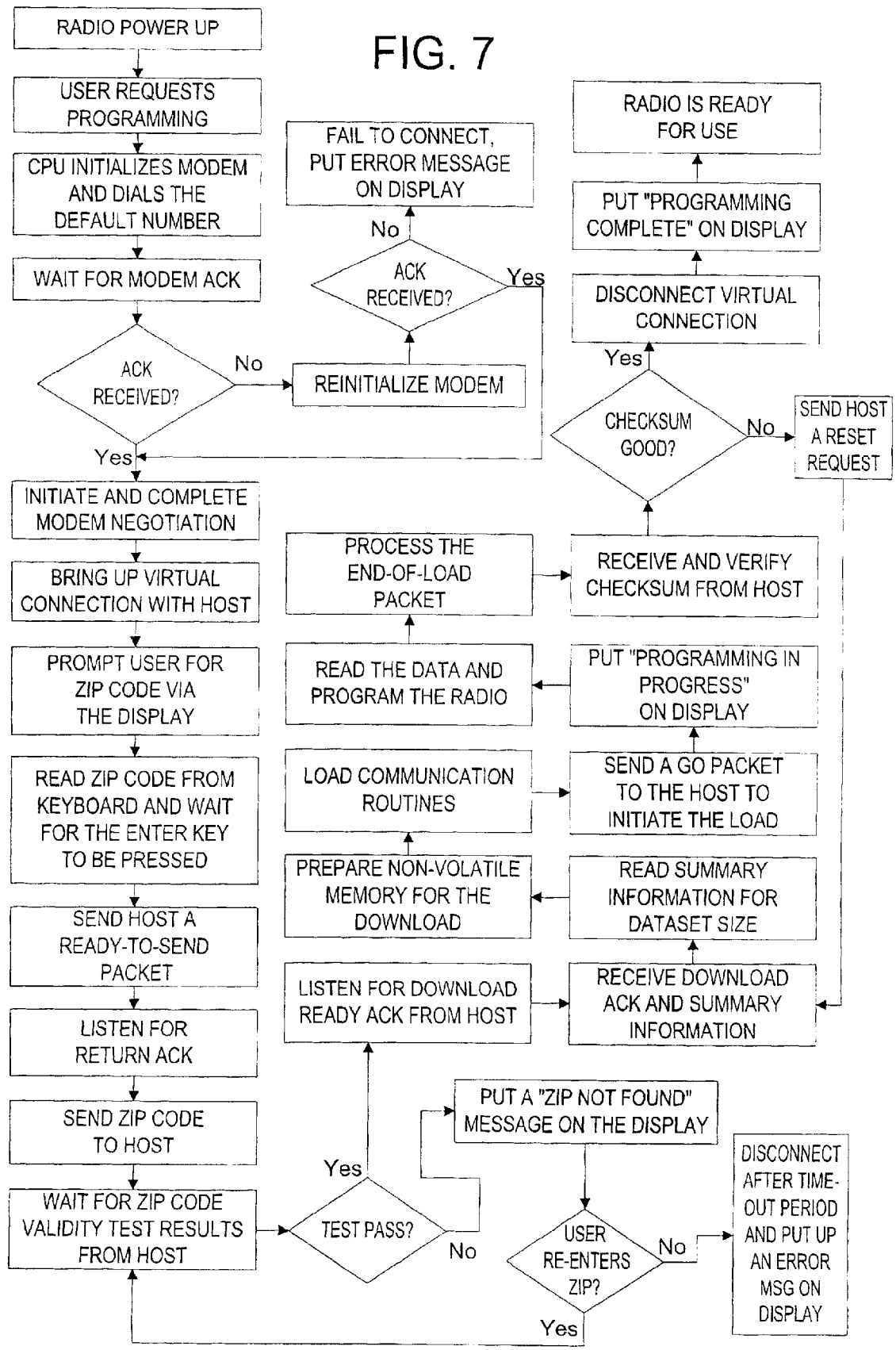
FIG. 7 is a flow chart illustrating an example of frequency scanning radio receiver programming.

FIG. 7 illustrates an example of the operation of the frequency scanning radio receiver during automatic programming. In order to program a radio receiver automatically, the listener presses the "program" key on the keyboard 72, causing the CPU 62 to execute an automatic programming routine stored in the memory 64. The CPU 62 transmits a request signal to the modem 68 to dial a default telephone number for the host system, stored in the non-volatile portion of memory 66. The CPU 62 then waits for an ACK signal from the modem 68 indicating that the request was successfully received. If no ACK is received within a predetermined time period, the CPU 62 reinitializes the modem 68 and resends the request. The CPU 62 preferably retries the request a predetermined number of times, then sends an error message to the display 74.

Once the modem 68 successfully connects with the modem of the host system, the modems perform handshaking and agree on common characteristics, for example, baud rate. Upon successful completion of handshaking, a serial communications link is established between the host system hardware and the scanning radio hardware. Any serial communications protocol for transmitting and receiving data electronically may be used. In a preferred embodiment, the communications protocol comprises an RS232 protocol.

Once the connection is established, the radio receiver modem 68 sends a signal to the CPU 62 indicating that the connection was successful. The CPU 62 then sends a message to the display 74 that prompts the listener to enter programming request information, for example, a postal code. The listener preferably enters a postal code for the geographical location where the listener desires to monitor radio frequency transmissions. As an alternative to a postal code, the listener's telephone number may be used. The geographic code is entered using the keyboard 72. When the "enter" key is pressed, the CPU 62 indicates to the host system that a postal or other geographic code is ready to be sent. The host system receives this message and sends an acknowledgment signal when it is ready to receive the code. Again, the radio may wait for a predetermined time period and resend the ready-to-send signal if the host does not respond within the predetermined period.

Once the radio receiver receives the acknowledge signal from the host, the radio receiver sends the code to the host system. The radio CPU 62 waits for the host to send an acknowledge signal. The radio CPU 62 may wait for a predetermined time period and resend the code if the host does not respond within the predetermined time period. Upon receiving the code, the host system searches the geographic information data base 30 for the postal or other locality code. If the host system is unable to locate the geographic information, the host system sends a signal to the CPU 62 indicating that the code entered by the operator is invalid. The CPU 62 sends a message to the display 74 indicating that the code is invalid. The CPU 62 preferably prompts the listener to enter a valid code. If the user enters a valid code within a predetermined time period, the host system uses the new code to extract a city or town, and uses the city or town to extract frequency allocation data. If the user does not enter a valid code, the host system preferably includes a time out function that breaks the connection with the frequency scanning radio receiver. The time out feature prevents a frequency scanning radio receiver from tying up host system resources with an invalid code.

When the host system has created the frequency data, as described above, the host system sends a ready-to-send signal to the CPU 62. The signal includes the size of the frequency data. The CPU 62 prepares a non-volatile portion of the memory 66 to receive the frequency data and sends an acknowledge signal to the host. The host then sends the frequency data to the frequency scanning radio receiver.

The CPU 62 preferably verifies the validity of the data received from the host system, e.g., by verifying size and checksum information transmitted with the data. The CPU 62 then preferably sends a message to the display 74, indicating that the data was received successfully, for example, "Programming Complete". In this manner, the host system automatically programs the frequency scanning radio receiver from a remote location. The only actions required by the listener are pressing a "program" key and entering a geographic code such as a postal, e.g., zip, code.

The CPU 62 stores the frequency data in the non-volatile portion of the memory 66 and uses the frequency data to control the tuner 61. For example, the FREQUENCY fields in the records of the frequency data may define a set of frequencies that the frequency scanning radio receiver scans, excluding all other frequencies. Alternatively, the radio receiver may scan a continuous range of frequencies and stop to monitor a transmission only if the transmission occurs at one of the frequencies indicated in the FREQUENCY fields of the records stored in the memory 66.

According to another feature, the memory locations in which the CPU 62 stores the records of the frequency data may be used to define the frequencies that the radio receiver scans. For example, the memory 66 may be divided into banks and sub-banks. The banks may be physical divisions in the memory 66, i.e., separate chips, or virtual divisions, separated by addresses. A bank or sub-bank may be used to define a subset of frequencies that a listener desires to monitor. For example, the listener may desire to monitor only state police transmissions. The keyboard 72 may include a "State" key and a "Police" key. If the operator presses both keys, the CPU 62 reads the frequencies stored in the state bank and the police sub-bank, and the radio receiver then monitors only state police transmissions. Similar keys may be included for selection of other subsets of frequencies for monitoring.

An exemplary method by which the CPU 62 arranges the frequency data received from the host system into banks and sub-banks utilizes the modified service code in each record. For example, each record includes a frequency, a description or identification of the transmitting party, and a modified service code. An exemplary record may comprise, "33.660; Westford Fire;TF". The CPU 62 may use the first character in the service code field to specify a bank in memory and the second character to specify a sub-bank, or vice versa. For example, the first characters T, C, S, and R may specify city, county, state, and regional banks, respectively. The second characters P, F, H, and L may specify police, fire, highway, and government sub-banks, respectively. The invention is not limited to storing records in banks and sub-banks. The frequency data may be arranged in memory in any manner for selective access of the records and control of the tuner 61.

Frequency scanning radio receivers according to the invention may identify the transmitting party to the listener. In an exemplary embodiment, USER fields in the frequency data received from the host system comprise the user identification data that is displayed to the listener. As discussed above, the host system modifies the USER field of a record to contain a description of the transmitting party. Each record includes a FREQUENCY field in addition to the USER field. When a transmission occurs at the frequency stored in the FREQUENCY field, the frequency scanning radio receiver identifies the transmitting party and displays the identity to the listener. For example, for the record, "33.660 Westford Fire TF", if the receiver 60 receives a transmission at a frequency of 33.660 MHz, the CPU 60 transmits a signal to the display 74 that displays "Westford Fire". In this manner, the receiver displays the identity of a transmitting party to the listener. The invention is not limited to displaying particular identifying information. Displaying any identifying information in addition to or instead of the transmitting party, including frequency, is within the scope of the invention.

Figure 8:
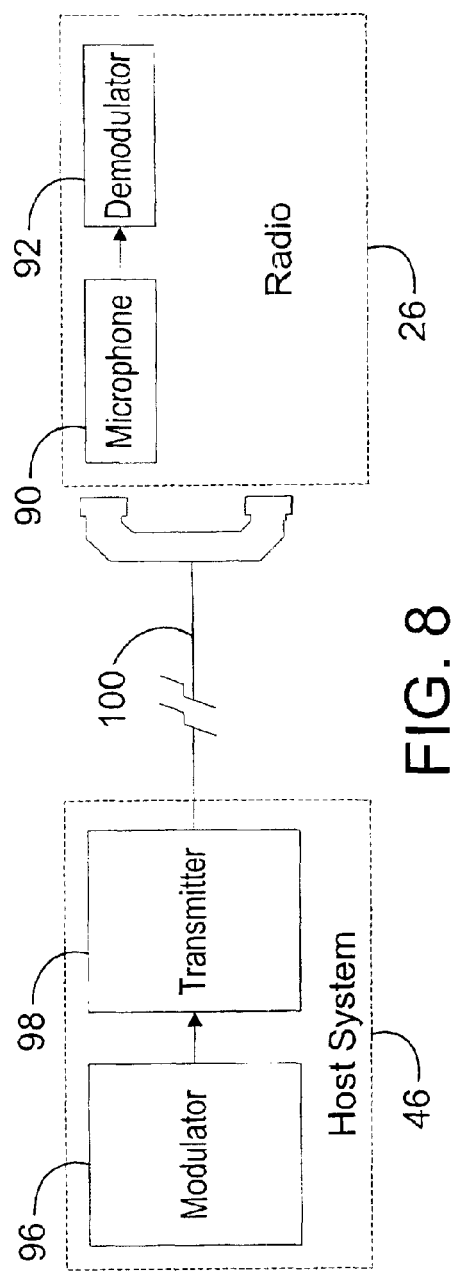
FIG. 8 is a block diagram of a frequency scanning radio receiver programming apparatus according to an alternative embodiment of the present invention.

The described embodiments illustrate a frequency scanning radio receiver that connects to a host system through a telephone network using a modem. FIG. 8 illustrates an alternative embodiment in which a frequency scanning radio receiver 2b includes an acoustical modem comprising a microphone circuit 90, and a demodulator circuit 92 for receiving frequency data from a host system 4b in a modulated audio format, e.g., via a telephone handset 94. The host system 4b according to such an embodiment includes an audio modulator circuit 96 and an audio transmitter circuit 98 for transmitting a modulated audio signal over a telephone network 100. Any modulation scheme capable of transmitting audio signals to the scanning radio receiver through a telephone network may be used. For example, the audio data may be frequency modulated, amplitude modulated, or phase modulated. In operation, a listener dials a telephone number for the host system 4b using a telephone. When the host system 4b answers, the listener places the telephone handset 94 proximate the microphone 90, and inputs a code for a geographical area. The host system 4b receives the code and retrieves the frequency data, as discussed above. The modulator circuit 96 then transforms the frequency data into a modulated audio signal and the transmitter circuit 96 transmits the signal to the frequency scanning radio receiver 2b through the microphone circuit 90. The demodulator circuit 92 demodulates the signal into a digital format usable by the radio receiver 2b.

In another alternative embodiment, a scanning radio may be automatically programmed using a wireless network, for example, a pager network. The pager network comprises a network of antennas that transmit digital information to personal pager devices.

In yet another embodiment, a frequency scanning radio receiver may be automatically programmed through a connection to the Internet. In that arrangement, the frequency scanning radio receiver includes an appropriate input port, such as an RS232 port, that may be directly connected to a computer or to an external modem. In use, the computer or external modem establishes communication with the Internet which provides questions for the user so that the appropriate programming information can be directly supplied to the receiver.

Figure 9:
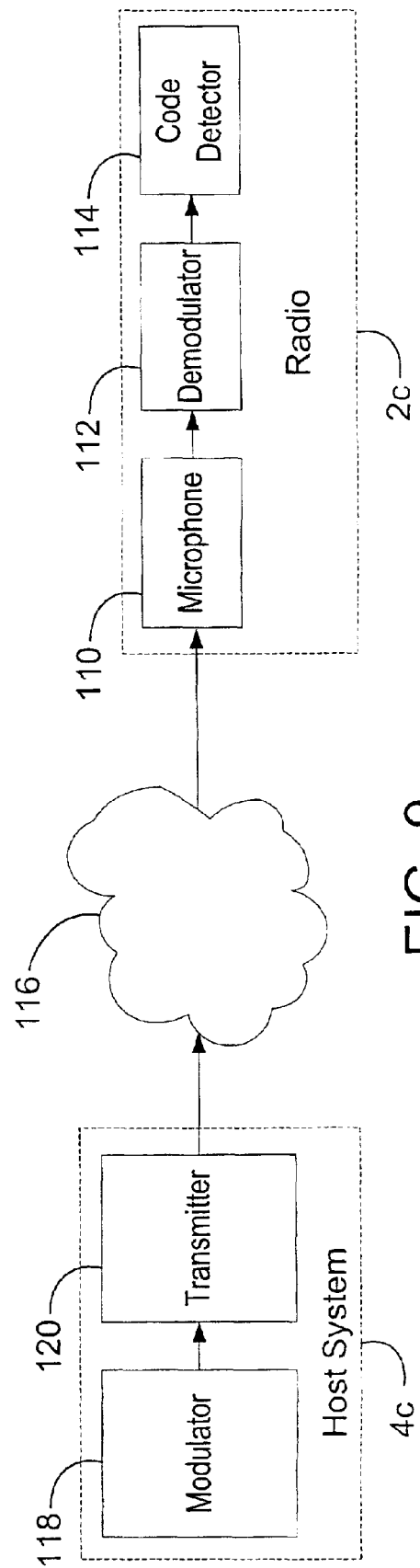
FIG. 9 is a block diagram of a frequency scanning radio receiver programming apparatus according to another alternative embodiment of the present invention.

FIG. 9 illustrates such a frequency scanning radio receiver programming system. A frequency scanning radio receiver 22c according to the illustrated embodiment includes a radio frequency receiver 110. The receiver 110 may be separate from the receiver used to monitor radio frequency transmissions, or the receiver 110 may be a part of the same receiver used to monitor radio frequency transmissions.

The frequency scanning radio receiver 2c includes a demodulator circuit 112 coupled to the receiver 110 to demodulate frequency data sent from the host system. A code detector circuit 114 is coupled to the demodulator circuit 112 to determine if frequency data sent from the host system through a wireless network 116 is addressed to the frequency scanning radio receiver. For example, the code detector circuit 114 may be programmed or manufactured to receive data when the identification code comprises the serial number of the frequency scanning radio receiver. Additional circuits, such as the CPU and memories, are included in the frequency scanning radio receiver 2c but are not shown in FIG. 9.

A host system 4c according to the illustrated embodiment includes a modulator circuit 118, for example, a frequency modulator circuit, to modulate the frequency data that is to be transmitted to the frequency scanning radio receiver 2c over the wireless network 116. The host system also includes a transmitter for transmitting data to the pager network 116. For example, if the host system connects to the wireless network via an RF link, the transmitter circuit includes an RF transmitter circuit. Additional circuits such as a CPU and memories are included, but are not shown in FIG. 9. The host system 4c may also include an automated telephone answering system (not shown) to receive programming requests from frequency scanning radio receiver listeners and to input the requests to the host system CPU.

In operation, a listener calls a telephone number for the host system using a telephone. The host system 4c answers the call, e.g., either using a human operator or an automated answering system. The host system 4c then prompts the listener for identification information used to address the frequency scanning radio receiver 2c, for example, a serial number of the frequency scanning radio receiver 2c. The listener then either manually or vocally inputs the response using the telephone. The host system 4c prompts the listener for geographical information regarding the location for monitoring transmissions. The listener enters the geographic information, e.g., a postal code, to the host system. The host system uses the geographical information to extract frequency data from the data bases, as discussed above. The host system uses the identification information entered by the listener to address the frequency scanning radio receiver. For example, the identification information may be a digital signal that precedes the programming information in a transmission through the wireless network 116. The modulator circuit 118 preferably converts the ID code and the programming data into a modulated signal, for example, a frequency modulated signal and transmits the signal to the wireless network 116. The wireless network 116, through the network of RF antennas, transmits the data to the frequency scanning radio receiver 2c. The frequency scanning radio receiver 2c receives the transmission using the receiver 110. The demodulator circuit 112 demodulates the signal into a digital format. The code detector circuit 114 detects whether a transmission is directed to its frequency scanning radio receiver and, if so, alerts the CPU to the incoming frequency data. The CPU stores the frequency data in memory. In this manner, the receiver is automatically programmed using a wireless network.

A frequency scanning radio receiver according to the invention can be further improved and simplified by incorporating, externally or internally, a communication device for communicating with a geographical positioning system so that the geographical location of the frequency scanning radio receiver can be determined automatically in terms of latitude and longitude. A frequency scanning radio receiver according to the invention can be further improved by incorporating a frequency data base within the frequency scanning radio receiver. The addition to a frequency scanning radio receiver of both a communication device for determining the geographical location of the frequency scanning radio receiver by communicating with a geographical positioning system and a data base of frequency data provides a frequency scanning radio receiver that can be completely automatic in reprogramming frequency data as the location of the frequency scanning radio receiver changes. Further, by incorporating a data base of frequency data within the frequency scanning radio receiver, the necessity of a host system and apparatus for communicating with a host system can be eliminated. The following description of a frequency scanning radio receiver with these features relies on the foregoing description. Elements with the same functions as already described are given the same reference numbers and are not again described at length to avoid duplication.

Figure 10A:
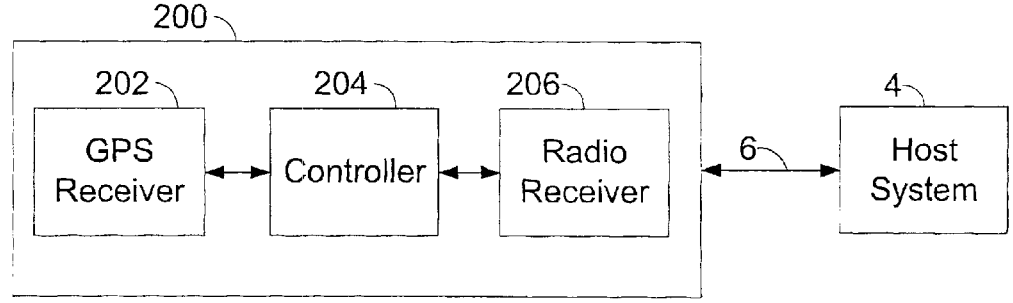
FIGS. 10a and 10b are block diagrams of frequency scanning radio receiver programming apparatus according to embodiments of the present invention.
Figure 10B:
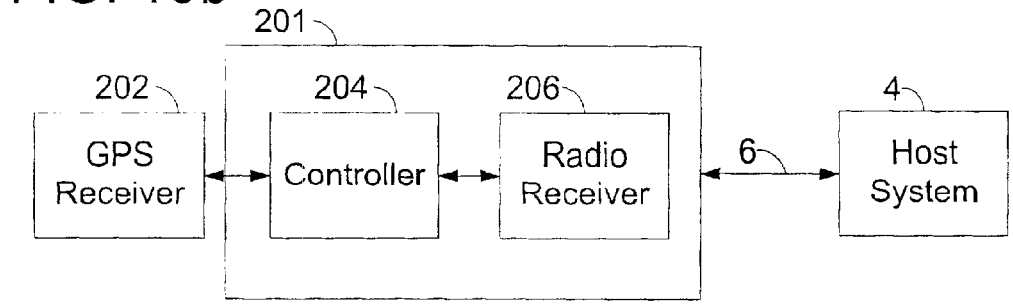

FIGS. 10a and 10b schematically illustrate embodiments of the frequency scanning radio receivers 200 and 201 according to the invention and communicating with the host system 4 through the communication medium 6. The frequency scanning radio receivers 200 and 201 differ from the frequency scanning radio receiver 2 described with respect to FIG. 1 by including a communication device 202 for communicating with a geographical positioning system and a controller 204. Presently, the most usable geographical positioning system is the Global Positioning System (GPS) employing artificial satellites. Preferably, the communication device 202 is a GPS receiver. The GPS receiver 202 is connected through the controller 204 to a radio receiver 206 that incorporates a memory storing a control program, a processing circuit, and, optionally, a modem. The radio receiver 206, like the receiver previously described, may be a single receiver that functions as the frequency scanning radio receiver and also as a radio for communicating through the communication medium 6 with the host system 4.

The difference between the frequency scanning radio receivers 200 and 201 is the connection to the GPS receiver 202. In the frequency scanning radio receiver 200, the GPS receiver is internal to the receiver. In this embodiment, the receiver 206 may share common elements with the GPS receiver 202. In addition, the GPS receiver 202, when contained in the same package as the radio receiver 206 and the controller 204, may share power supplies and other common circuitry. Alternatively, the radio receiver 206 may include two receivers, one dedicated to the frequency scanning receiver function and another dedicated to the programming function, i.e., communication with the host system. In each of these instances, the radio receiver 206 includes a modem or similar modulating device and a transmitting function for communicating with the host device 4. In the frequency scanning radio receiver 201, the GPS receiver 202 is external to the housing of the radio receiver 206 and is connected, for example, with a cable to a jack on the radio receiver 206 through the controller 204. In both embodiments, the GPS receiver is coupled to the radio receiver 206.

The GPS receiver 202 is a conventional GPS receiver dedicated to receiving and processing signals from artificial satellites and using these signals to determine the geographical location of the receiver, preferably in terms of latitude and longitude, sometimes referred to here as lat/lon. Such receivers are commercially available as free-standing units and some include output terminals for supplying signals bearing the location information to other apparatus, such as the receiver 206, in a conventional communications protocol such as RS 232. The controller 204, described in more detail below, may be part of a microprocessor, i.e., the processing circuit, for example, the CPU 62 described above that also controls the radio receiver 206. The controller and processing circuit together are sometimes referred to here generically as the processing circuit.

Figure 11A:
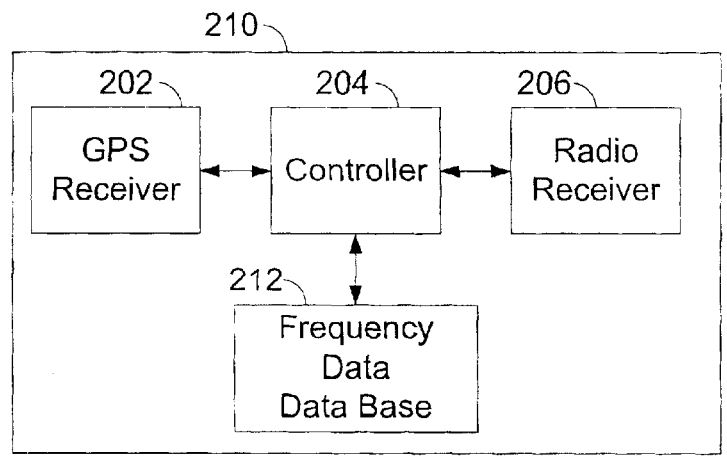
FIGS. 11a and 11b are block diagrams of frequency scanning radio receiver programming apparatus according to further embodiments of the present invention.
Figure 11B:
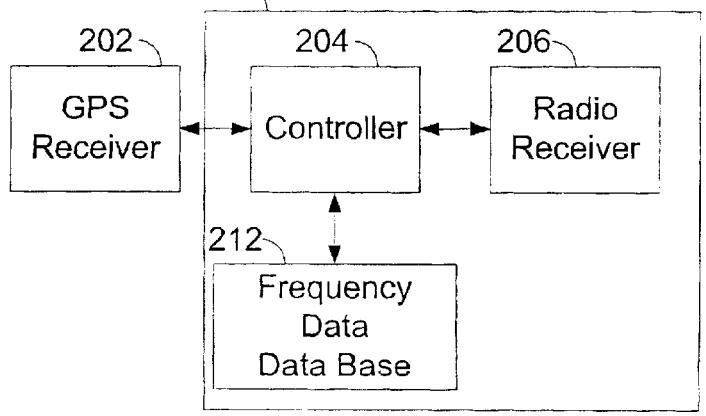

Alternative and more complex embodiments 210 and 211 of frequency scanning radio receivers according to the invention are shown in FIGS. 11a and 11b. These embodiments are respectively identical to the embodiments 200 and 201 of FIGS. 10a and 10b except that the frequency scanning radio receivers 210 and 211 include an internal data base 212 of frequency data. Therefore, the embodiments of FIGS. 11a and 11b do not require a modem or transmitting function for connection to a host system. In effect, the host system is contained within these frequency scanning radio receivers. The data base 212 may be a plug-in read only memory (ROM) that may be replaced from time-to-time to update the frequency data information contained within the data base 212. Alternatively, the data base 212 may include a non-volatile but programmable memory and the frequency scanning radio receivers 210 and 211 may include transceivers, such as a modem or other communication means, for periodically reprogramming the data base 212 to maintain the currency of its content.

The novel frequency scanning radio receivers 200, 201, 210, and 211 may be hand-held, portable units or may be mobile units that are mounted on a mobile platform, such as an automobile or truck or other platform, including even a ship or an airplane. Because of the presence of the GPS receiver 202 as a first communication device, it is unnecessary for the user of the frequency scanning radio receiver to determine or even input the location of the receiver. Rather, the location is determined by the GPS receiver 202. Determination of the position of the receiver may be either manually controlled or automatic.

The frequency scanning radio receiver may include an input key of a keypad or a soft key for manually activating the controller 204 to request the GPS receiver 202 to determine the geographical location of the frequency scanning radio receiver. The GPS receiver 202 is turned on, acquires satellite signals, and produces location information as electronic signals, preferably in latitude and longitude form. That location information is supplied to the controller 204 which makes a calculation to determine a change in geographical location of the frequency scanning radio receiver since the previous location determination or, more preferably, since the last update of the frequency data stored in the frequency scanning radio receiver memory. That last update is the most recent previous time access was made to the frequency data base 212, if the internal data base is present, or the most recent previous time access was made to the host system. The memory within the receiver retains this information, i.e., last access and corresponding geographical location of the frequency scanning radio receiver, until the next update, when that information is, itself, updated, i.e., replaced with newer information.

If the change in location since the last frequency data update exceeds some threshold distance, for example, ten miles or twenty miles, then a message is produced on the display of the frequency scanning radio receivers 200, 201, 210, and 211, alerting the user that the frequency data stored within the frequency scanning radio receiver 200 may need to be updated. If the change in location is less than the specified distance threshold, then either no message is produced or a message indicating that no update is required is displayed.

If an update of frequency data is required with respect to the receivers 200 and 201, then a connection is made through the communication medium 6 to the host system 4, following the procedures previously described, particularly with respect to FIGS. 7–10, to update the frequency data in the memory of the receivers 200 and 201. As previously described, connection to a host system to obtain frequency data may be through a telephone connection and an acoustical modem, through a personal computer, an electronic modem, and the Internet, through a wireless connection including a paging network, or by any other means or communication medium 6. The frequency scanning radio receivers 210 and 211 function in a similar way. However, since the data base 212 of frequency data is already present in the radio, the update may automatically occur without any further activity by the user. Messages may be displayed sequentially indicating that the programming process is occurring and that the frequency scanning radio receiver function is temporarily disabled and that the reprogramming of the frequency data has been completed.

Alternatively, the determination as to whether an update of the frequency data contained in the memory of the frequency scanning radio receiver is required may occur automatically, without manual intervention. Automatic determination as to whether an update is necessary is particularly advantageous when the frequency scanning radio receiver is mounted on a mobile platform, such as an automobile or truck. Assuming a maximum speed for such a vehicle, it can be determined that updating of the frequency data in the memory may be needed at specific time intervals corresponding to a maximum distance traveled in that time. For example, if it is assumed that the vehicle will travel at sixty miles per hour, it may be appropriate to make a determination as to whether the location of the receiver has changed sufficiently each twenty minutes or one-half hour as to make reprogramming necessary or advisable. In this embodiment, the controller 204 includes a timer set to repeatedly determine the passage of time corresponding to the threshold distance, at the maximum expected speed, at which reprogramming would be advisable. After the passage of each such time period, the controller 204 automatically triggers the GPS receiver 202 to determine the location of the frequency scanning radio receiver. Then, the process already described is repeated, i.e., a determination is made as to whether the change in location since the last reprogramming is sufficient to warrant reprogramming. If so, reprogramming is initiated, possibly only after further action by the user for a receiver like the receivers 200 and 201 requiring communication with the host system 4 or, preferably, automatically for a receiver like receivers 210 and 211 that include the data base 212 including the frequency data that is also available from the host system 4 for the receivers 200 and 201.

The use of the host system 4 has the advantage that the host system can include a large computer memory containing a large volume of frequency allocation records, for example, obtained from the FCC. The central computer location can be regularly updated with new information, remaining current. By contrast, the data base 212, a ROM or EEPROM, for example, has a memory of finite capacity and must have a size convenient for the frequency scanning radio receivers 210 and 211. The data base 212, in order to accommodate such space requirements, may include frequency data for a limited portion of a large geographical area, for example, the United States, or a geographical area through with the user of the radio intends to travel. The memory may be custom programmed based upon the geographical areas of interest from data available from the host system. Preferably, user identification information is stored in the data base 212 after pausing for display, as described above, to reduce the computing capacity of a portable receiver and to minimize memory requirements.

While the frequency scanning radio receiver 210 is illustrated as including both the GPS receiver 202 as well as the data base 212, an embodiment of the invention may include the data base 212 without the presence of the GPS receiver 202. In that arrangement, the host system 4 is unnecessary but an independent means of determining and inputting the location of the frequency scanning radio receiver must be provided.

Among the advantages of the frequency scanning radio receivers 200, 301, 210, and 211 is the elimination of a need to determine the user's location in terms of postal codes and locality names, such as townships or counties. In fact, by directly obtaining and using latitude and longitude information through the GPS receiver or some other geographical positioning system that is or may become available, the necessity of continually determining potentially obscure information is eliminated. The search engine for assembling frequency data for a specific geographical location is simpler whether in a host system or internal to a frequency scanning radio receiver including the data base 212.

Figure 12:
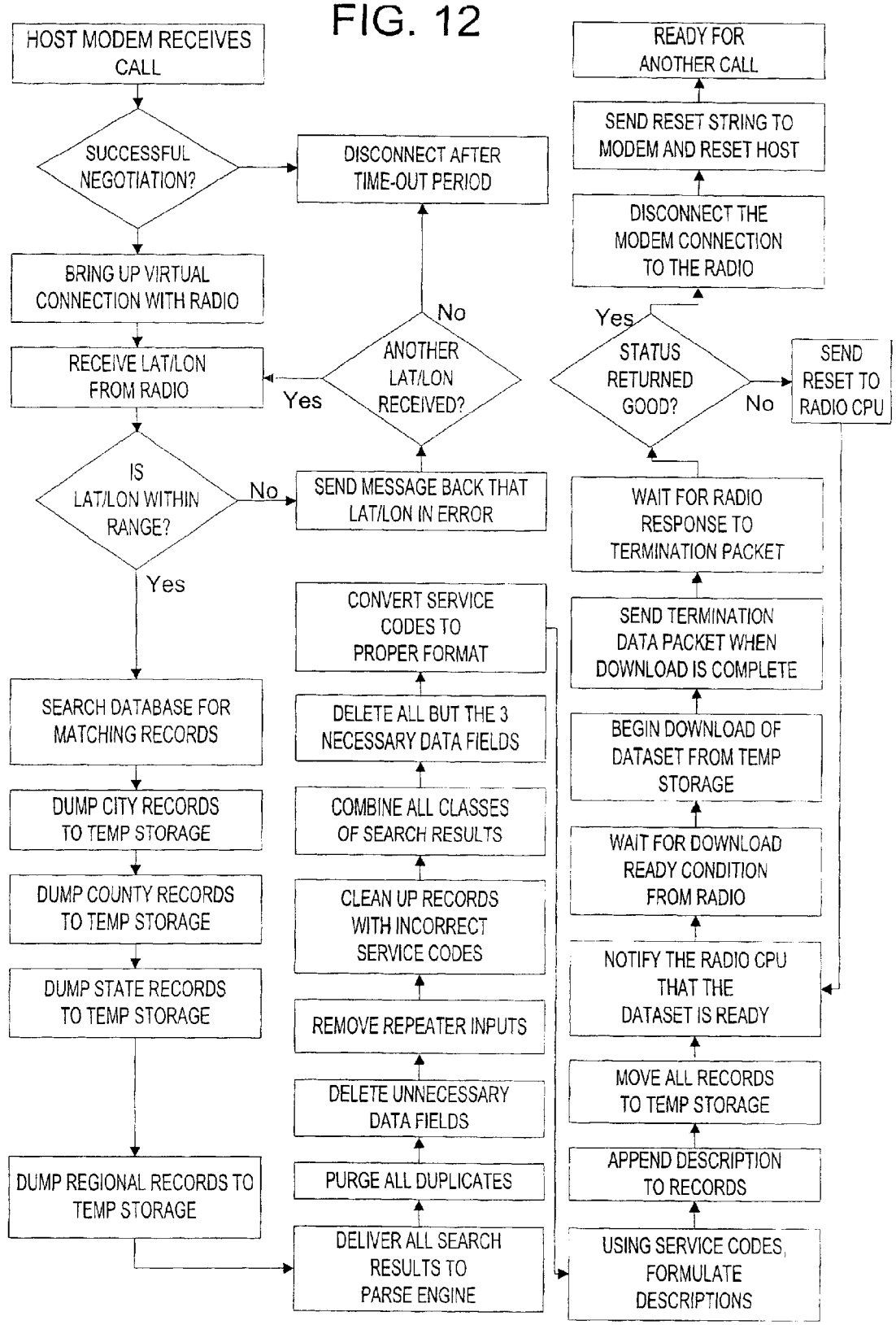
FIG. 12 is a flow chart illustrating an example of the operation of a host system according to an embodiment of the present invention.

FIG. 12 is a flow chart illustrating the programming of a frequency scanning radio receiver, such as any of the receivers 200 201, 210, and 211, in which the location of the receiver is determined by a communication device, such as the GPS receiver 202, communicating with a geographical positioning system. The flow chart of FIG. 12 illustrates the steps taken by the host system 4, receiving the location information from the receiver 200, and supplying frequency data for programming the receiver. FIG. 12 is similar to, but simpler than, the process illustrated in FIG. 5. Therefore, only the differences between the two processes are mentioned here. Since the location of the frequency scanning radio receiver is determined by the GPS receiver 202, there is no necessity for any step of translating a postal code, i.e., zip code, to a generalized location. Rather, the location information is provided directly as latitude and longitude information that can be readily compared to frequency allocation records identifying the locations of transmitters by latitude and longitude. Therefore, a number of steps illustrated in FIG. 5, translating postal code or other non-lat/lon data into lat/lon data, are unnecessary in this embodiment and do not appear in FIG. 12.

FIG. 12 still includes a test to determine whether the latitude and longitude supplied from the GPS are within a reasonable range, e.g., zero degrees to ninety degrees and zero degrees to three hundred sixty degrees, and, if not, providing an error message and an opportunity for manual correction. As in the process of FIG. 5, failure of correction leads to a time-out, terminating the reprogramming process. With the exception of these differences from FIG. 5, the process of supplying frequency data illustrated schematically in FIG. 12 is the same as the process of FIG. 5. However, the host system is simplified since no correlation table between postal codes and locality names and latitude and longitude locations is required.

Figure 13:
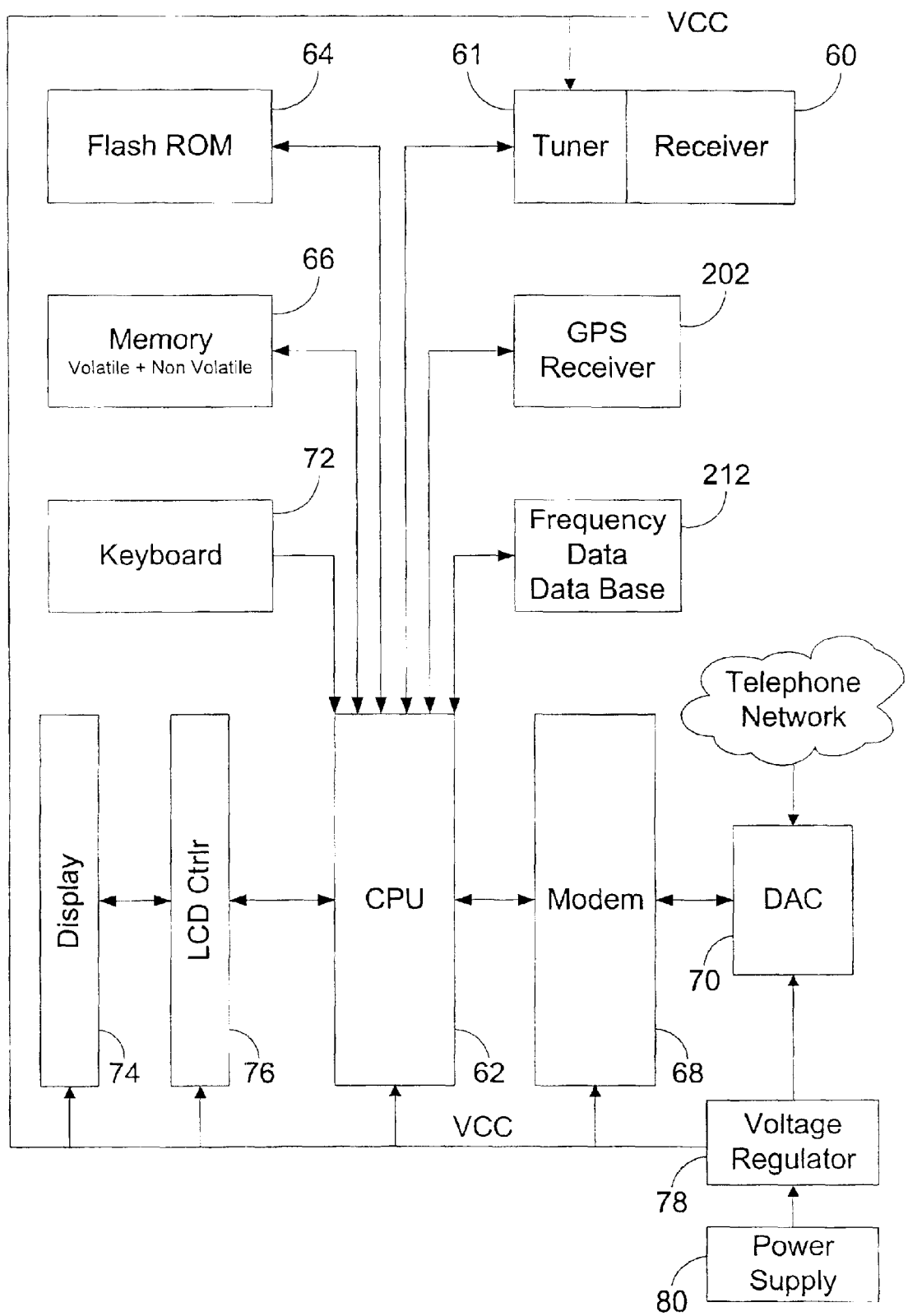
FIG. 13 is a block diagram of a frequency scanning radio receiver according to an embodiment of the present invention.

FIG. 13 is a schematic illustration of the elements of a frequency scanning radio receiver according to embodiments of the invention. Only the parts of that schematic diagram that differ from FIG. 6 are described. In addition to the elements shown in FIG. 6, the frequency scanning radio receiver illustrated in FIG. 13 includes the GPS receiver 202 under control of the CPU 62 and, optionally, the frequency data data base 212, also under control of the CPU 62. The modem 68 and the digital-to-analog converter 70 are optional in this embodiment. As previously described, the GPS receiver 202 determines the location of the frequency scanning radio receiver either in response to a manual programming request input through the keyboard 72 to the CPU 62 or, automatically, upon the passage of each fixed time interval, in response to an instruction from the CPU 62. FIG. 13 is schematic. While the GPS receiver 202 and the frequency data base 212 are shown there, they may not be within the same package as in receiver 201 and 211.

Figure 14:
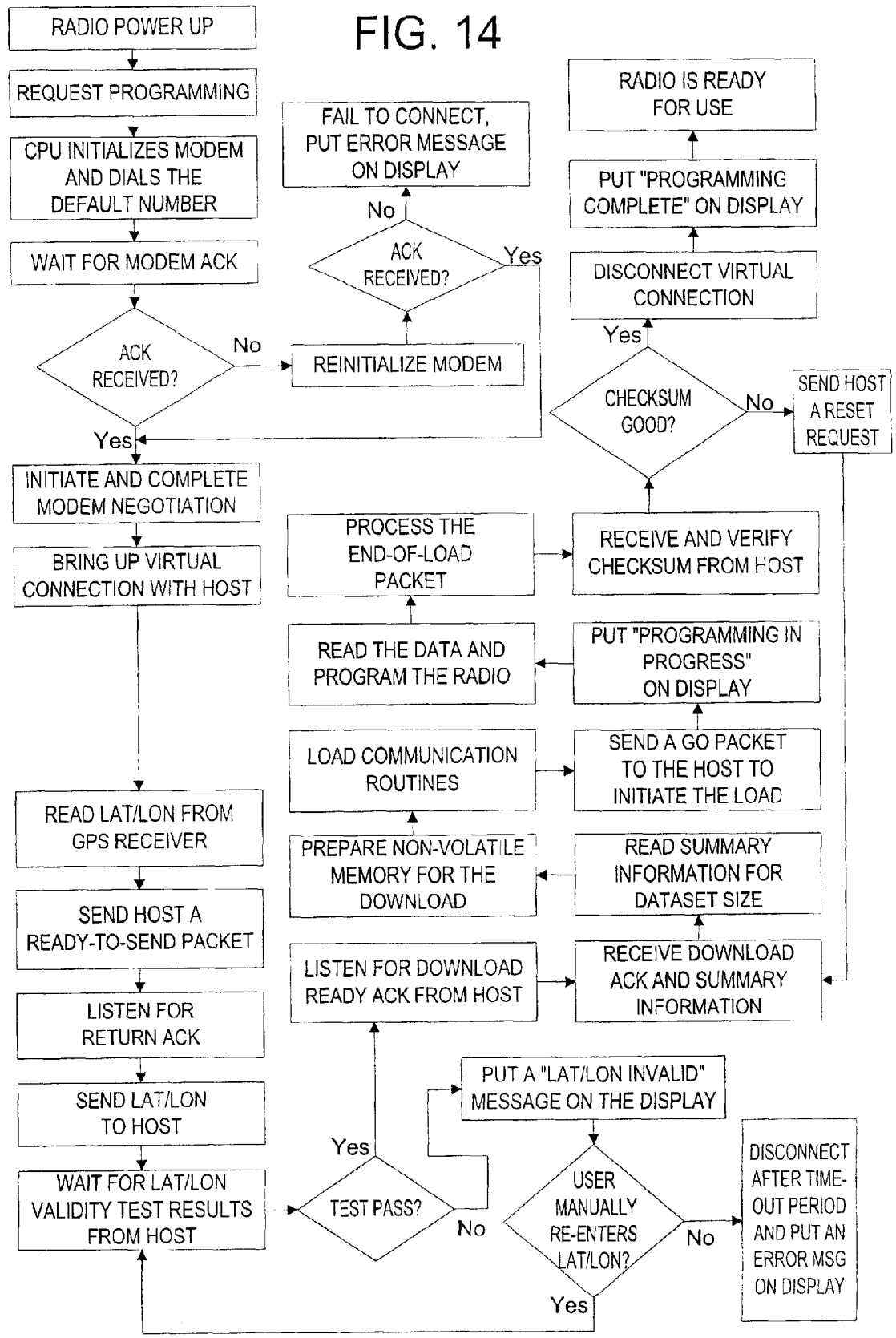
FIG. 14 is a flow chart illustrating an example of frequency scanning radio receiver programming according to an embodiment of the present invention.
Figure 15:
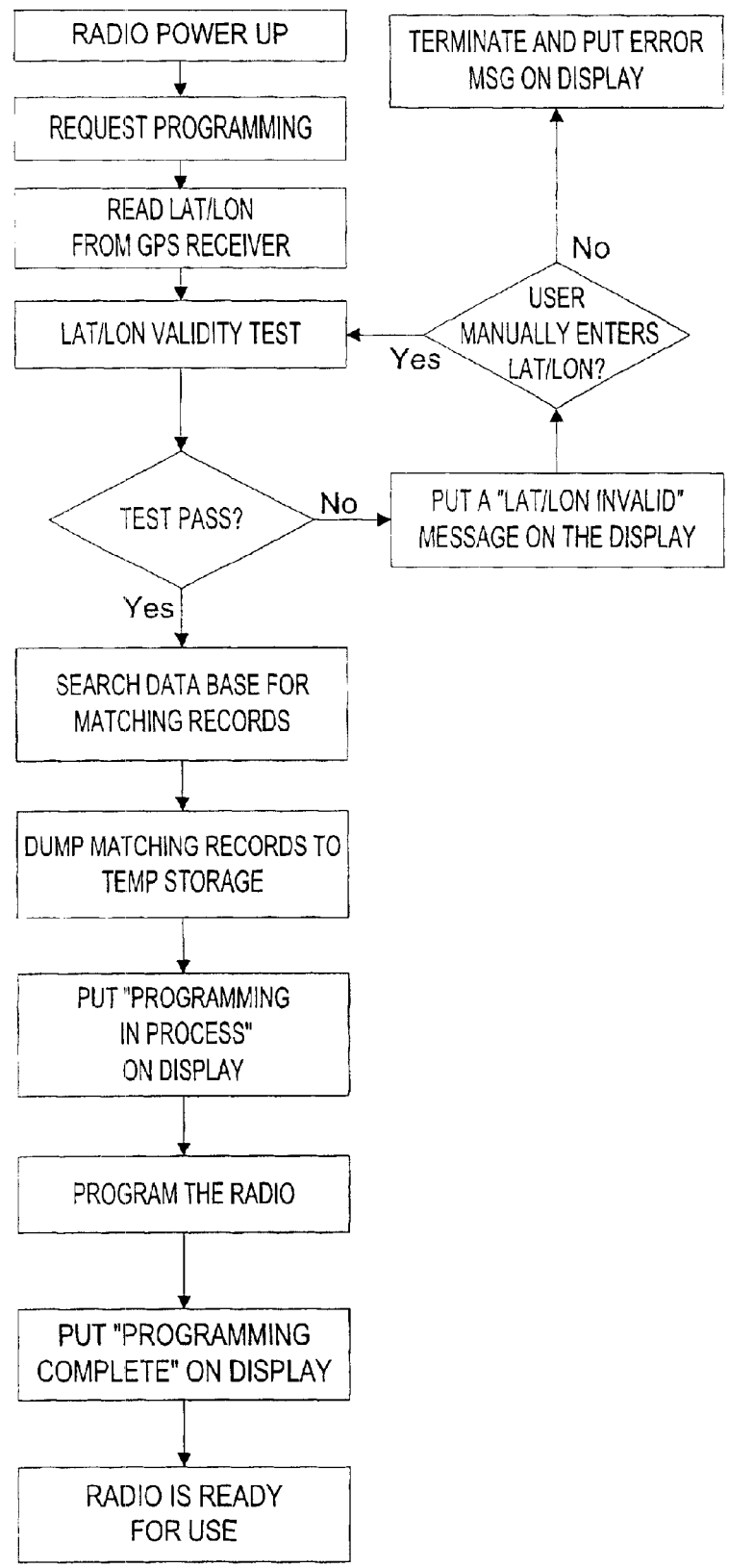
FIG. 15 is a flow chart illustrating an example of frequency scanning radio receiver programming from an internal frequency data base according to an embodiment of the present invention.

When the frequency data data base 212 is included in the frequency scanning radio receiver, functioning as the resource for frequency data regardless of the location of the radio receiver, the modem 68 and the digital-to-analog converter 70 are not needed for obtaining frequency data from a host system to program the radio receiver. However, it may be useful to include the modem and digital-to-analog converter to update the data base 212 in the event the memory of that data base is fixed in place and may be altered. The memory of the data base 212 is different from and relatively larger than the flash memory 64 and the memory 66 illustrated in FIG. 13. Those memories 64 and 66 include the program for control and operation of the frequency scanning radio receiver as well as the frequency data used in the operation of the radio receiver, i.e., identifying frequencies of transmissions that are of interest and that are to be monitored for the current location of the frequency scanning radio receiver. Of course, a single memory of a particular type, partitioned for these different memory functions, may be used. FIGS. 14 and 15 are flow diagrams illustrating processes of programming frequency scanning radio receivers according to the invention. FIG. 14 illustrates such a process when a host system is employed, for example, with the radio receiver embodiments 200 and 201 of FIGS. 10a and 10b and FIG. 15 illustrates the far simpler process of programming a frequency scanning radio receiver such as the embodiments 210 and 211 of FIGS. 11a and 11b including both the GPS receiver for determining the location of the radio receiver and the data base 212 supplying frequency data. Both of FIGS. 14 and 15 are similar to FIG. 7 and, therefore, only the differences between those figures and FIG. 7, which was earlier described, are explained.

In the process of FIG. 14, in which the frequency scanning radio receiver communicates with the host system, that communication is initiated by the user of the frequency scanning radio receiver. Essentially, the process is the same as in FIG. 7 except that postal code information is not sent to the host system and need not be input through the keyboard of the receiver. Instead, the location of the frequency scanning radio receiver is expressed in terms of latitude and longitude and supplied directly from the GPS receiver to the host system for processing and for the selection of frequency data pertinent to the location specified.

The process of FIG. 15 is clearly substantially simpler than the process of FIG. 14 since there is no necessity of establishing a link to the host system over a communication medium, no hand-shaking routine, and no necessity of checking for communication errors occurring in the communication medium. All that is required is specification of the location of the radio receiver, information provided directly from the GPS receiver, a test to ensure that the location information is valid, and the search routine that would normally be carried out in the host system. If the location information is invalid, the user is given an opportunity to manually enter correct information or to correct the information that is supplied from the GPS. The searching in this embodiment requires that the CPU 62 of FIG. 13 include a search engine and have sufficient computing power to select the frequency data needed by the frequency scanning radio receiver from the data base 212.

The process of FIG. 15 assumes that no parse engine is present in the frequency scanning radio receiver and that the frequency data in the data base 212 has already been processed so that user identification and service code can be directly retrieved with the frequency data that is correlated with transmitter location. The pre-processing of the frequency data stored in the data base 212 is preferred when the data base is internal to the frequency scanning radio receiver to minimize the required computational capacity of the CPU 62. If a parse engine is part of the frequency scanning radio receiver, then the steps in the middle and right columns of FIG. 5 have to be added to the process illustrated in FIG. 15 to describe fully the collection of frequency data for a particular geographical location. The parse engine steps illustrated in FIG. 5 are not exclusive and simpler search and data organization routines may be employed, particularly with a simplified data base 212, to achieve acceptable search times with reasonable computer searching capacity.

While the invention has been described in the foregoing paragraphs with respect to its application to programmable frequency scanning radio receivers, the invention has still other applications. For example, the invention may be applied to a transceiver that has a programmable feature. The invention is applicable to transceivers that operate in either simplex or duplex operation, i.e., with a single frequency for transmission and reception or different frequencies for transmission and reception. The invention is particularly applicable to such transceivers as may be used by civilian and military organizations that move through geographical areas that are sufficiently large that at least one transmitter or receiver frequency must be changed due to the change in location.

Examples of programmable transceivers according to the invention are shown in FIGS. 16a, 16b, 17a, and 17b. The transceiver 214 in FIG. 16a generally corresponds to the receiver 200 of FIG. 10a with the exception that a radio transmitter 216 is also present. The controller 204 controls the operation of the radio transmitter 216 and the frequencies on which it transmits, just as the controller controls the frequencies that are monitored by the radio receiver 206. In the transceiver 214, the GPS receiver 202 is contained within the same package as the radio receiver 206 and the radio transmitter 216.

Figure 16A:
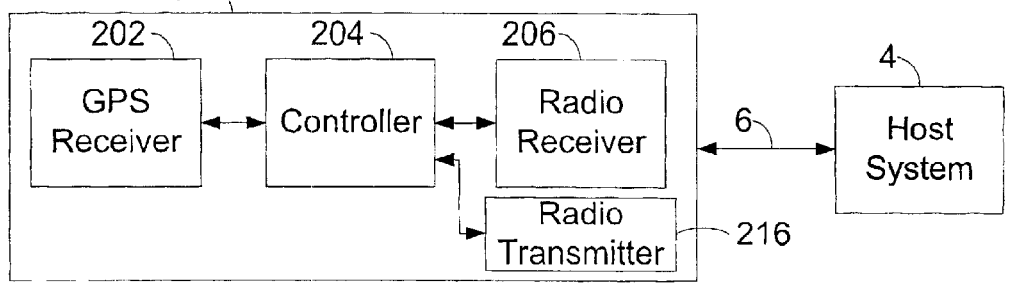
FIGS. 16a and 16b are block diagrams of transceiver programming apparatus according to embodiments of the invention.
Figure 16B:
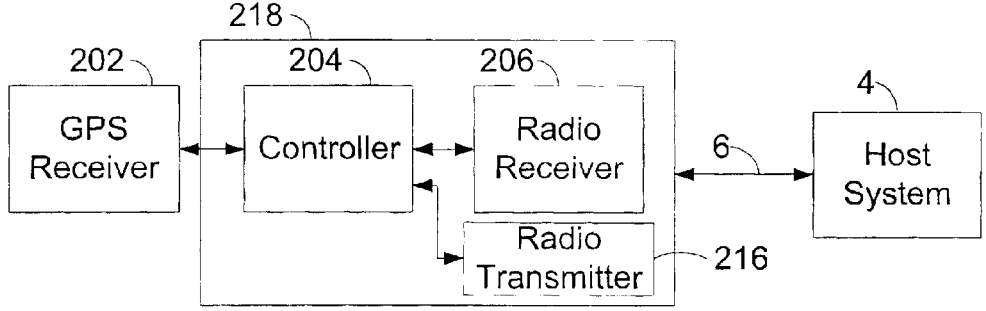

In the embodiment of FIG. 16b, the transceiver 218 is similar to the receiver 201 of FIG. 10b but also includes the radio transmitter 216. In the transceiver 218, the GPS receiver 202 is external to the package containing the radio receiver 206 and the radio transmitter 216. The GPS receiver may be coupled to the transceiver 218 by an external cable extending between jacks or plugs in one or both of the GPS receiver 202 and the transceiver 218.

Figure 17A:
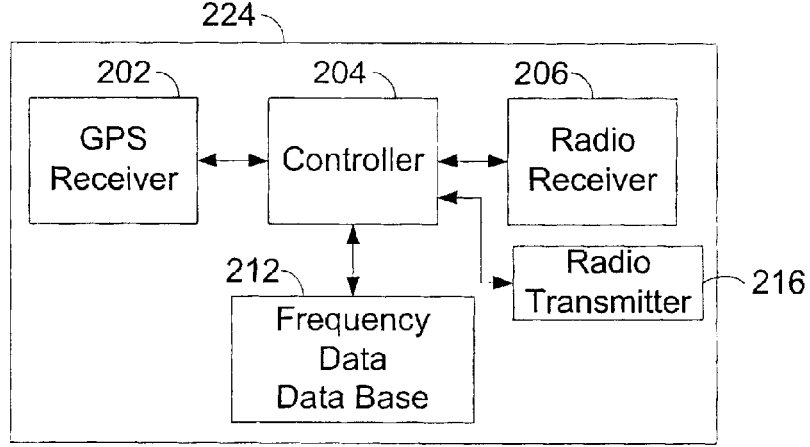
FIGS. 17a and 17b are block diagrams of transceiver programming apparatus according to further embodiments of the present invention.

FIG. 17a illustrates a programmable transceiver 224 that is identical to the transceiver 214 of FIG. 16a except that the transceiver 224 includes the internal frequency data data base 212. Thus, the programmable transceiver 224 does not require a radio or modem for communicating with a host system at a remote location containing a frequency data data base with frequency allocation information and corresponding geographical location information for each of the frequency allocations. Instead, that data base is contained within the frequency data data base 212.

Figure 17B:
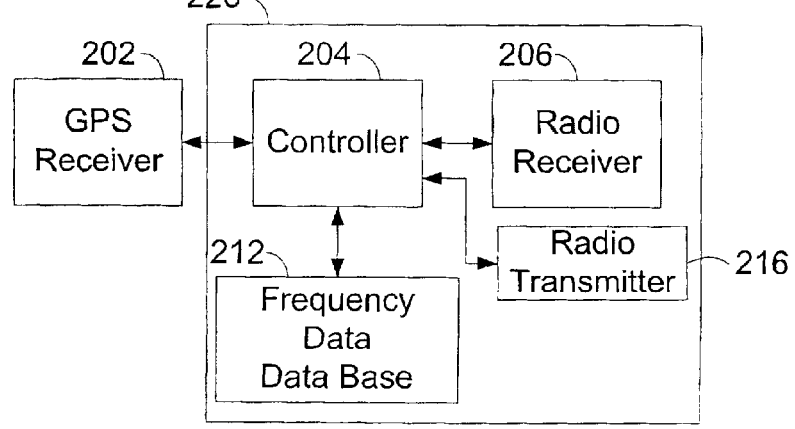

Finally, in FIG. 17b, the transceiver 226 is essentially the same as the transceiver 224 of FIG. 17a except that the GPS receiver 202 is not contained within the same package as the radio receiver 206 and the radio transmitter 216. While the external GPS receiver 202 requires connection via a cable or some other means to the transceiver 226, the same GPS receiver 202 can be used with many such transceivers, even including transceiver 218 of FIG. 16b, reducing transceiver cost.

As in the previously described programmable frequency scanning radio receivers, in the transceiver embodiments of FIGS. 16a, 16b, 17a, and 17b a request for an update of the frequency data stored within the memory in the transceiver may be requested manually, for example, by actuating a keypad of a soft key, or automatically from time-to-time without manual input. The latter feature is particularly useful since continual reprogramming may occur without the knowledge or involvement of the user of the transceiver. The change in frequencies of operation, both for transmission and reception, may be seamless, i.e., without an indication to the user of the change in frequency that has occurred. The user would be able to continue communication continually while changing location without interruption for reprogramming of the transceiver frequency or frequencies.

The transceiver, in the programming function, operates in the same fashion already described with respect to the programmable frequency scanning radio receiver. The interaction with a remote host containing a data base follows the process of FIG. 14, for example, and the process of reprogramming the frequency data with an internal data base follows, for example, the process of FIG. 15. A difference may occur when different receiving and transmitting frequencies are employed by the transceiver. In that event, an appropriate identifier with respect to each frequency allocation must be used to identify which frequencies are to be used by the radio receiver of the transceiver and which are to be used by the radio transmitter of the transceiver. In general, while not affecting overall operation of the invention, in the transceiver, fewer operating frequencies may be retained at one time as compared to a frequency scanning radio receiver in which a relatively large number of discrete frequencies may be present in the frequency data for monitoring of transmissions.

Figure 18:
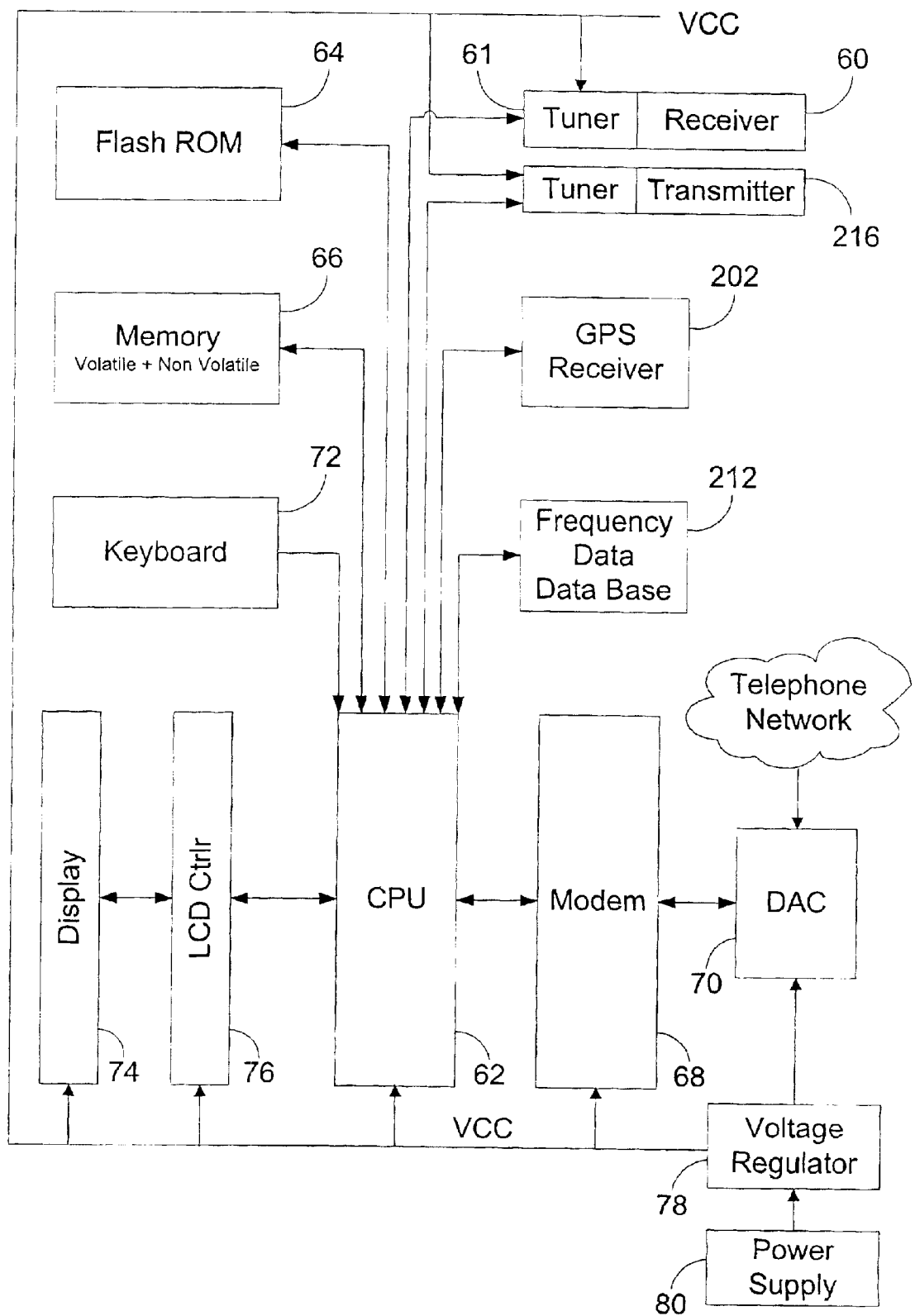
FIG. 18 is a block diagram of a transceiver according to an embodiment of the present invention.

FIG. 18 is a schematic illustration of a transceiver apparatus according to the invention. FIG. 18 is essentially the same as FIG. 13 except for additionally including the transmitter 216 that incorporates a tuner under the control of the CPU 62. In FIG. 18, as in FIGS. 16a, 16b, 17a, and 17b, elements that have already been described with respect to other figures are given the same reference numbers and are not described again.

While the invention has been described in some detail by way of illustration and example, the invention is susceptible to various modifications and alternative forms, and is not restricted to the specific embodiments disclosed. It should be understood that these specific embodiments are not intended to limit the invention but, on the contrary, the intention is to cover all modifications, equivalents, and alternatives falling within the spirit and scope of the invention as defined in the following claims.

What is claimed is:

1. A programmable frequency scanning radio receiver comprising:

a receiver for receiving radio frequency transmissions at each of a plurality of discrete frequencies;

a first communication device coupled to the frequency scanning radio receiver for determining geographical location of the frequency scanning radio receiver by communication with a geographical positioning system;

a memory for storing frequency data, the frequency data including plurality of frequencies corresponding to respective transmitting parties of interest located within a reception range of the geographical location of the frequency scanning radio receiver;

a processing circuit coupled to the memory, the receiver, and the first communication device, accessing the memory, controlling the receiver to operate at the frequencies of the frequency data in the memory, and controlling and receiving a determination of the geographical location of the receiver by the first communication device for updating the frequency data; and a second communication device coupled to the processing circuit for communicating with a host system containing a data base of frequency allocation and geographical location information corresponding to the frequency allocations and located remotely from the receiver, supplying the geographical location of the frequency scanning radio receiver determined by the first communication device to the host system, and receiving the frequency allocations for the geographical location of the frequency scanning radio receiver from the host system, the processing circuit storing the frequency allocations for the geographical location in the memory as the frequency data.

2. The programmable frequency scanning radio receiver according to claim 1 wherein the first communication device and the receiver are contained in a single package.

3. The programmable frequency scanning radio receiver according to claim 1 wherein the first communication device and the receiver are contained in separate packages.

4. The programmable frequency scanning radio receiver according to claim 1 wherein the processing circuit, in response to a request, determines distance between a current geographical location of the receiver determined through the first communication device and a geographical location determined through the first communication device at last previous access of the data base and only accesses the data base to update the frequency data stored in the memory if the distance exceeds a minimum distance.

5. The programmable frequency scanning radio receiver according to claim 1 wherein the processing circuit, in response to a request, determines distance between a current geographical location of the receiver determined through the first communication device and a geographical location determined through the first communication device at last previous access of a data base of frequency allocation and geographical location information corresponding to the frequency allocations, and only accesses the data base to update the frequency data stored in the memory if the distance exceeds a minimum distance.

6. The programmable frequency scanning radio receiver according to claim 1 comprising an input device coupled to the processing circuit for manually entering a request for the first communication device to determine the geographical location of the frequency scanning radio receiver.

7. The programmable frequency scanning radio receiver according to claim 1 wherein the processing circuit automatically makes a request for determination of the geographical location of the frequency scanning radio receiver through the first communication device based upon passage of time since the last request for determination of geographical location.

8. A programmable frequency scanning radio receiver comprising:

a receiver for receiving radio frequency transmissions at each of a plurality of discrete frequencies;

a memory for storing frequency data, the frequency data including a plurality of frequencies corresponding to respective transmitting parties of interest located within a reception range of the frequency scanning radio receiver;

a data base of frequency allocations and geographical location information corresponding to the frequency allocations, internal to the frequency scanning radio receiver, for programming the frequency scanning radio receiver; and a processing circuit coupled to the memory, the receiver, and the data base, assembling the frequency data from the data base, based on geographical location of the frequency scanning radio receiver, storing in the memory the frequency data assembled from the data base, and controlling the receiver to monitor transmissions at the frequencies of the frequency data in the memory.

9. A method of automatically programming frequency scanning radio receiver to monitor transmissions on programmed discrete frequencies comprising:

determining geographical location of the frequency scanning radio receiver through a first communication device coupled to the frequency scanning radio receiver by communicating with a geographical positioning system;

in response to the geographical location determination, assembling frequency data, with a search engine within the frequency scanning radio receiver, from a data base internal to the frequency scanning receiver and including frequency allocations and geographical location information corresponding to the frequency allocations, for locations proximate the geographical location of the frequency scanning radio receiver determined through the first communication device;

supplying the frequency data from the data base to a memory in the frequency scanning radio receiver; and in response to the frequency data received from the data base, programming the frequency scanning radio receiver to monitor transmissions on operating frequencies of the frequency data.

10. The method of claim 9 including manually requesting the first communication device to determine the geographical location of the frequency scanning radio receiver.

11. The method of claim 9 including automatically determining the geographical location of the frequency scanning radio receiver through the first communication device at respective time intervals.

12. The method of claim 9 including in response to a determination of current geographical location of the frequency scanning radio receiver, determining distance between the current geographical location and the geographical location since last access of the data base, and assembling the frequency data only if the distance exceeds a minimum distance.

13. A method of automatically programming a frequency scanning radio receiver to monitor transmissions on programmed discrete frequencies comprising:

determining geographical location of the frequency scanning radio receiver through a first communication device coupled to the frequency scanning radio receiver by communicating with a geographical positioning system;

in response to the geographical location determination, assembling frequency with a data base including frequency allocations and geographical location information corresponding to the frequency allocations, for locations proximate the geographical location of the frequency scanning radio receiver determined through the first communication device, wherein the data base is located in a host system remote from the frequency scanning radio receiver and including sending a programming request to the host system through a second communication device internal to the frequency scanning radio receiver, and receiving the frequency data from the host system through the second communication device, the frequency data being assembled in the host system;

supplying the frequency data from the data base to a memory in the frequency scanning radio receiver; and in response to the frequency data received from the data base, programming the frequency scanning radio receiver to monitor transmissions on operating frequencies of the frequency data.

14. The method of claim 13 including manually requesting the first communication device to determine the geographical location of the frequency scanning radio receiver.

15. The method of claim 13 including automatically determining the geographical location of the frequency scanning radio receiver through the first communication device at respective time interval.

16. The method of claim 13 including, in response to a determination of current geographical location of the frequency scanning radio receiver, determining distance between the current geographical location and the geographical location since last access of the data base, and assembling the frequency data only if the distance exceeds a minimum distance.

17. A programmable transceiver comprising:

a receiver for receiving radio frequency transmissions at each of a plurality of discrete frequencies;

a transmitter for transmitting radio frequency transmissions at each of a plurality of discrete frequencies;

a first communication device coupled to the transceiver for determining geographical location of the transceiver by communication with a geographical positioning system;

a memory for storing frequency data, the frequency data including a plurality of frequencies corresponding to respective transmitting and receiving parties of interest located within a reception and transmission range of the geographical location of the transceiver; and a processing circuit coupled to the memory, the receiver, the transmitter, and the first communication device, accessing the memory, controlling the receiver and the transmitter to operate at the frequencies of the frequency data in the memory, and controlling and receiving a determination of the geographical location of the transceiver by the first communication device for updating the frequency data.

18. The programmable transceiver according to claim 17 wherein the first communication device and the transceiver are contained in a single package.

19. The programmable frequency scanning radio receiver according to claim 17 wherein the first communication device and the transceiver are contained in separate packages.

20. The programmable transceiver according to claim 17 including a data base of frequency allocations, and geographical location information corresponding to the frequency allocations internal to the transceiver, wherein the processing circuit, in response to a determination of geographical position of the transceiver through the first communication device, accesses the data base, selects frequency allocations for the geographical location of the transceiver, and stores the frequency allocations selected as the frequency data in the memory.

21. The programmable transceiver according to claim 20 wherein the processing circuit, in response to a request, determines distance between a current geographical location of the receiver determined through the first communication device and a geographical location determined through the first communication device at last previous access of the data base and only accesses the data base to update the frequency data stored in the memory if the distance exceeds a minimum distance.

22. The programmable transceiver according to claim 17 wherein the processing circuit, in response to a request, determines distance between current geographical location of the transceiver determined through the first communication device and a geographical location determined through the first communication device at last previous access of a data base of frequency allocation and geographical location information corresponding to the frequency allocations, and only accesses the data base to update the frequency data stored in the memory if the distance exceeds a minimum distance.

23. The programmable transceiver according to claim 17 comprising an input device coupled to the processing circuit for manually entering a request for the first communication device to determine the geographical location of the transceiver.

24. The programmable transceiver according to claim 17 wherein the processing circuit automatically makes a request for determination of the geographical location of the transceiver through the first communication device based upon passage of time since the last request for determination of geographical location.

25. The programmable transceiver according to claim 17 comprising a second communication device coupled to the processing circuit for communicating with a host system containing a data base of frequency allocation and geographical location information corresponding to the frequency allocations and located remotely from the transceiver, supplying the geographical location of the transceiver determined by the first communication device to the host system, and receiving the frequency allocations for the geographical location of the transceiver from the host system, the processing circuit storing the frequency allocations for the geographical location in the memory as the frequency data.

26. A programmable transceiver comprising:

a receiver for receiving radio frequency transmissions at each of a plurality of discrete frequencies;

a transmitter for transmitting radio frequency transmission at each of a plurality of discrete frequencies;

a memory for storing frequency data, the frequency data including a plurality of frequencies corresponding to respective transmitting and receiving parties of interest located within a reception and transmission range of the transceiver;

a data base of frequency allocations and geographical location information corresponding to the frequency allocations, internal to the transceiver, for programming the transceiver; and a processing circuit coupled to the memory, the receiver, the transmitter, and the data base, assembling the frequency data from the data base, based on geographical location of the transceiver, storing in the memory the frequency data assembled from the data base, and controlling the receiver and the transmitter to operate at the frequencies of the frequency data in the memory.

27. A method of automatically programming a transceiver to operate on programmed discrete frequencies comprising:

determining geographical location of the transceiver through a first communication device coupled to the transceiver by communicating with geographical positioning system;

in response to the geographical location determination, assembling frequency data from a data base including frequency allocations and geographical location information corresponding to the frequency allocations for locations proximate the geographical location of the transceiver determined through the first communication device;

supplying the frequency data from the data base to a memory in the transceiver; and in response to the frequency data received from the data base, programming the transceiver to operate on operating frequencies of the frequency data.

28. The method of claim 27 wherein the data base is internal to the transceiver and including assembling the frequency data with a search engine within the transceiver.

29. The method of claim 27 wherein the data base is located in a host system remote from the transceiver and including sending a programming request to the host system through a second communication device internal to the transceiver, and receiving the frequency data from the host system through the second communication device, the frequency data being assembled in the host system.

30. The method of claim 27 including manually requesting the first communication device to determine the geographical location of the transceiver.

31. The method of claim 27 including automatically determining the geographical location of the transceiver through the first communication device at respective time intervals.

32. The method of claim 27 including, in response to a determination of current geographical location of the transceiver, determining distance between the current geographical location and the geographical location since last access of the data base, and assembling the frequency data only if the distance exceed a minimum distance.

* * * * *